United States Patent
Lu et al.

(10) Patent No.: US 9,807,810 B2
(45) Date of Patent: Oct. 31, 2017

(54) PHYSICAL CHANNEL DESIGN FOR NETWORK-ASSISTED D2D

(71) Applicant: Telefonaktiebolaget L M Ericsson (publ), Stockholm (SE)

(72) Inventors: Qianxi Lu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/650,484

(22) PCT Filed: Dec. 13, 2012

(86) PCT No.: PCT/CN2012/086487
§ 371 (c)(1),
(2) Date: Jun. 8, 2015

(87) PCT Pub. No.: WO2014/089791
PCT Pub. Date: Jun. 19, 2014

(65) Prior Publication Data
US 2015/0319796 A1  Nov. 5, 2015

(51) Int. Cl.
*H04W 88/12* (2009.01)
*H04W 72/08* (2009.01)
(Continued)

(52) U.S. Cl.
CPC ........ *H04W 76/023* (2013.01); *H04B 7/2615* (2013.01); *H04B 7/2656* (2013.01);
(Continued)

(58) Field of Classification Search
CPC ....... H04L 1/18; H04L 1/1861; H04L 5/0055; H04W 72/00; H04W 72/04; H04W 76/023
See application file for complete search history.

(56) References Cited

U.S. PATENT DOCUMENTS 8,861,452 B2 * 10/2014 Barbieri et al. .............. 370/329
9,125,183 B2 *  9/2015 Kwon ................. H04W 76/023
(Continued)

FOREIGN PATENT DOCUMENTS

| CN | 101977101 A | 2/2011 |
|---|---|---|
| CN | 102461297 A | 5/2012 |

(Continued)

OTHER PUBLICATIONS

"Notification of Transmittal of the International Search Report and the Written Opinion of the International Searching Authority," for Counterpart PCT Application No. PCT/CN2012/086487, mailed Sep. 19, 2013, 10 pages.

(Continued)

*Primary Examiner* — Ayaz Sheikh
*Assistant Examiner* — Debebe Asefa
(74) *Attorney, Agent, or Firm* — Nicholson De Vos Webster & Elliott, LLP

(57) ABSTRACT

A method in a network node for multiplexing a physical channel between the network node and devices in a mixed wireless network, wherein the mixed wireless network comprises a cellular network comprising one or more cellular channels and a Device-to-Device (D2D) network comprising one or more D2D channels. The method includes time division multiplexing the physical channel between a first group of cellular channels and a first group of D2D channels, and frequency division multiplexing the physical channel between a second group of cellular channels and the first group of D2D channels.

21 Claims, 16 Drawing Sheets

(51) Int. Cl.

| | | |
|---|---|---|
| *H04W 72/12* | (2009.01) | |
| *H04W 74/02* | (2009.01) | |
| *H04W 76/02* | (2009.01) | |
| *H04B 7/26* | (2006.01) | |
| *H04L 5/06* | (2006.01) | |
| *H04L 5/00* | (2006.01) | |
| *H04W 88/02* | (2009.01) | |

(52) U.S. Cl.
CPC .............. *H04L 5/0091* (2013.01); *H04L 5/06* (2013.01); *H04W 72/082* (2013.01); *H04W 74/02* (2013.01); *H04W 72/1226* (2013.01); *H04W 88/02* (2013.01); *H04W 88/12* (2013.01)

(56) References Cited

U.S. PATENT DOCUMENTS

| | | | |
|---|---|---|---|
| 9,407,390 B2* | 8/2016 | Lee | ............... H04L 5/0007 |
| 2009/0005057 A1 | 1/2009 | Lee et al. | |
| 2010/0061334 A1 | 3/2010 | Gault et al. | |
| 2011/0019634 A1 | 1/2011 | Fujii et al. | |
| 2012/0106502 A1 | 5/2012 | Goldhamer | |

FOREIGN PATENT DOCUMENTS

| | | |
|---|---|---|
| EP | 1343340 A1 | 9/2003 |
| EP | 2903393 A1 | 8/2015 |
| JP | 2009523382 A | 6/2009 |
| JP | 2009218638 A | 9/2009 |
| JP | 2011526446 A | 10/2011 |
| WO | 2011130626 A1 | 10/2011 |
| WO | WO-2011/124028 A1 | 10/2011 |
| WO | 2012003355 A1 | 1/2012 |
| WO | 2012015698 A1 | 2/2012 |
| WO | WO-2013/134891 A1 | 9/2013 |
| WO | 2013166455 A1 | 11/2013 |
| WO | WO-2014/032222 A1 | 3/2014 |

OTHER PUBLICATIONS

3GPP TS 36.101 v.11.2.0: "Evolved Universal Terrestrial Radio Access (E-UTRA); User Equipment (UE) radio transmission and reception," 3rd Generation Partnership Project, Technical Specification Group Radio Access Network (Release 11), (Sep. 2012), 359 pages.

"Extended European Search Report," for Counterpart EP Application No. 12889766.7, mailed Jul. 5, 2016, 9 pages.

Notification Concerning Transmittal of International Preliminary Report on Patentability for Counterpart PCT Application No. PCT/CN2012/086487 mailed Jun. 25, 2015, 6 pages.

Office Action with English translation for Japanese Patent Application No. 2015-546798 dated Jul. 29, 2016, 5 pages.

[Corrected] Written Opinion of the International Searching Authority for Counterpart PCT Application No. PCT/CN2012/086487 mailed Sep. 19, 2013, 4 pages.

Office Action with English translation for Japanese Patent Application No. 2015-546798 dated Jun. 23, 2017, 4 pages.

\* cited by examiner

PHYSICAL CHANNEL DESIGN FOR NETWORK-ASSISTED D2D

CROSS-REFERENCE TO RELATED APPLICATIONS

This application is a National stage of International Application No. PCT/CN2012/086487, filed Dec. 13, 2012, which is hereby incorporated by reference.

TECHNICAL FIELD

Embodiments herein relate to a network node and a method therein. In particular, embodiments herein relate to multiplexing a physical channel.

BACKGROUND

Devices such as User Equipments (UE) are also known as e.g. mobile terminals, wireless terminals and/or mobile stations. Devices are enabled to communicate wirelessly in a wireless communications system or wireless communication system, sometimes also referred to as a cellular radio system or cellular networks. The communication may be performed e.g. between two devices, between a device and a regular telephone and/or between a device and a server via a Radio Access Network (RAN) and possibly one or more core networks, comprised within the wireless communications system.

Devices may further be referred to as mobile telephones, cellular telephones, or laptops with wireless capability, just to mention some further examples. The devices in the present context may be, for example, portable, pocket-storable, hand-held, computer-comprised, or vehicle-mounted mobile devices, enabled to communicate voice and/or data, via the RAN, with another entity, such as device or a server.

The wireless communications system covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the devices within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for devices. The 3GPP has undertaken to evolve further the UTRAN and GSM based radio access network technologies.

According to 3GPP GSM EDGE Radio Access Network (GERAN), a device has a multi-slot class, which determines the maximum transfer rate in the uplink and downlink direction. EDGE is an abbreviation for Enhanced Data rates for GSM Evolution. In the end of 2008 the first release, Release 8, of the 3GPP Long Term Evolution (LTE) standard was finalized and later releases have also been finalized.

Recent developments of the 3GPP LTE facilitate accessing local Internet Protocol (IP) based services in the home, office, public hot spot or even outdoor environments. One of the important use cases for the local IP access and local connectivity involves the direct communication between devices in close proximity, typically less than a few 10 s of meters, but sometimes up to a few hundred meters of each other.

In network-controlled so-called Device-to-Device (D2D) communications, a network such as a radio access network assists devices that are in the proximity of each other to discover one another, in a process referred to as device discovery, and establish a direct link referred to as D2D bearer establishment, rather than a link via the base station. In fact, when two devices communicate with each other via a cellular base station, the communication path involves an uplink hop and a downlink hop, both with associated resources, as opposed to the single hop direct D2D link. In the context of this disclosure, the expression Downlink (DL) is used for the transmission path from the base station to the mobile station or device. The expression Uplink (UL) is used for the transmission path in the opposite direction i.e. from the mobile station or communication device to the base station.

The initiation of the establishment of the D2D link may be made by the radio access network or by any of the devices of the D2D pair. In network initiated D2D link establishment, the network realizes that two communicating devices are in proximity of each other. In device initiated D2D link establishment, the devices discover the proximity of each other and also some of their capabilities which is necessary for them to establish a D2D link, similar to Bluetooth.

In network-controlled D2D communication, a network control function performs at least one of: a) provisioning of a discovery signal to be used between two devices to determine their proximity and/or D2D link estimation, b) resource assignment for the D2D discovery signal and/or a D2D data channel and/or a D2D control channel, c) relaying of information between the at least two devices, and d) configuration of connection parameters for the at least two devices of the D2D link, such as power setting, e.g., actual, min, max, coding and modulation schemes, segmentation configuration, e.g., transport block sizes, parameters and/or security keys for encryption/integrity protection and protocol parameters.

A transmission in an LTE or Evolved Universal Terrestrial Radio Access Network (E-UTRAN) is based on Orthogonal Frequency Division Multiplexing (OFDM), whose format may be modeled as an OFDM time-frequency grid. The OFDM time-frequency grid is comprised in one axis of frequency values and in the other axis of time. The frequency axis is subdivided in a number of frequency sub-carriers, with a spacing that may typically correspond to 15 kHz, while the time axis is subdivided in OFDM symbol intervals.

Within the grid, a Physical Resource Block (PRB or RB) is a unit of transmission resource consisting of twelve consecutive sub-carriers in the frequency domain and one time slot, 0.5 ms, in the time domain.

The direct communication mode, or D2D communication, enables a number of potential gains over the traditional cellular technique, because D2D devices are much closer to one another than cellular devices that have to communicate via a cellular access point, e.g., a base station:

Capacity gain: First, radio resources, e.g., OFDM RB, between the D2D and cellular layers may be reused, i.e., reuse gain. Second, a D2D link uses a single hop between the transmitter and receiver points as opposed to the 2-hop link via a cellular access point, i.e., hop gain.

Peak rate gain: due to the proximity and potentially favorable propagation conditions, modulation and coding scheme (MCS) of higher order may be applied, so that, the maximum achievable data rate may be further improved, i.e., proximity gain;

Latency gain: When the devices communicate over a direct link, the base station forwarding is short cut and the end-to-end latency may decrease.

In a mixed cellular and D2D network resulting from the coexistence of these two systems, the Physical layer (PHY) channel design has to take into account the inter-system interference, i.e., interference between cellular sub-system and D2D sub-system. The coexistence of the systems may result in two types of interference: 1) co-channel or co-RB interference, i.e., interference on the same RB; and 2) inter-channel or inter-RB interference due to in-band emission, i.e., the interference from allocated RB to un-allocated RBs within the band. Here a band may be defined as a continuous frequency range (3GPP defined multiple bands in 3GPP TS 36.101, EUTRA User Equipment (UE) radio transmission and reception, 2012.03), and a corresponding carrier frequency is a specific frequency that is used to carry the radio signal which spans the whole frequency band.

As shown by the following table defined by 3GPP (3GPP TS 36.101, EUTRA User Equipment (UE) radio transmission and reception, 2012.03), the in-band emission, i.e., the interference from allocated RBs to un-allocated RBs within the band, is restricted to different levels for different cases, depending on the specific value of the system bandwidth, allocated RB size, Error Vector Magnitude (EVM), transmission power, etc. First, for a general case, i.e., when the measurement bandwidth is 1 RB and the limit is expressed as a ratio of measured power in one non-allocated RB to the measured average power per allocated RB, where the averaging is done across all allocated RBs. Second, for an image frequencies case, i.e., when the applicable frequencies for this limit are those that are enclosed in the reflection of the allocated bandwidth, based on symmetry with respect to the center carrier frequency, but excluding any allocated RBs. And third, for a carrier frequency leakage case, i.e., when the applicable frequencies for this limit are those that are enclosed in the RBs containing or adjacent to the DC frequency, but excluding any allocated RB.

TABLE 1

In-band Emission formula

| Parameter description | Unit | Limit (Note 1) | | Applicable Frequencies |
|---|---|---|---|---|
| General | dB | max {−25 − 10 · log$_{10}$(N$_{RB}$/L$_{CRBs}$), 20 · log$_{10}$ EVM −3 − 5 · (|Δ$_{RB}$|−1)/L$_{CRBs}$, −57 dBm/180 kHz − P$_{RB}$} | | Any non-allocated (Note 2) |
| IQ Image | dB | −25 | | Image frequencies (Notes 2, 3) |
| Carrier leakage | dBc | −25 | Output power >0 dBm | Carrier frequency (Notes 4, 5) |
| | | −20 | −30 dBm ≤ Output power ≤0 dBm | |
| | | −10 | −40 dBm ≤ Output power <−30 dBm | |

Where N$_{RB}$ is defined as the transmission bandwidth configuration, expressed in units of resource blocks, L$_{CRBs}$ is defined as the length of a contiguous resource block allocation, |Δ$_{RB}$| is defined as the starting frequency offset between the allocated RB and the measured non-allocated RB, P$_{RB}$ is defined as the transmitted power per 180 kHz in allocated RBs, measured in dBm. A simple calculation may be as follows: For a general item, given a 5 MHz bandwidth, 5 RBs allocated to a cellular device, whose transmission signalling EVM=0.175, Tx power=23 dBm, then the in-band emission would be I=max[−32, −18−x, −57], where x is the starting frequency offset between the allocated RB and the measured non-allocated RB, e.g., x=0 for the first adjacent RB outside of the allocated bandwidth, x=1 for the second, i.e., an emission from −18~−32 dB would be caused. This emission would be more serious for more allocated RB size, RBs most next to the allocated RB, larger EVM. As shown in FIG. 1, even if a −30 dB emission is assumed, a nearby cellular device, e.g., 10 m, would cause failure of D2D communication on neighboring band. According to International Mobile Telecommunications-Advanced (IMT-A) Indoor Non-Line of Sight (NLOS), path loss model: 43.3*log 10(10 m)+11.5+20*log 10(2 GHz)=60.82 dB.

Thus, co-channel and/or inter-channel interference is a problem in a mixed wireless network.

SUMMARY

It is therefore an object of embodiments herein to provide a way of improving the performance in a mixed cellular/D2D wireless network.

According to a first aspect of embodiments herein, the object is achieved by a method in a network node for multiplexing a physical channel between the network node and devices. The network node and the devices are comprised in a mixed wireless network. The mixed wireless network further comprises cellular network comprising one or more cellular channels and a Device-to-Device, D2D. network comprising one or more D2D channels. The network node time division multiplexes the physical channel between a first group of cellular channels and a first group of D2D channels. The network node frequency division multiplexes the physical channel between a second group of cellular channels and the first group of D2D channels.

According to a second aspect of embodiments herein, the object is achieved by a network node for multiplexing a physical channel between the network node and devices. The network node and the devices are comprised in a mixed wireless network. The mixed wireless network further comprises a cellular network comprising one or more cellular channels and a D2D network comprising one or more D2D channels. The network node comprises a processing circuit configured to: a. time division multiplex the physical channel between a first group of cellular channels and a first group of D2D channels, and b. frequency division multiplex the physical channel between a second group of cellular channels and the first group of D2D channels.

Since the physical channel is multiplexed, co-channel and inter-channel interference between cellular and D2D channels is avoided or reduced. The performance is thereby improved.

An advantage of embodiments herein is to provide a simplified PHY channel design to avoid or reduce the co-channel and inter-channel interference between cellular and D2D channels.

A further advantage according to embodiments herein is a PHY channel design that avoids or reduces the co-channel and inter-channel interference between cellular and D2D channels, and yet maximizes the usage of radio resources.

A further advantage according to embodiments herein is the background compatibility provided with the current 3GPP LTE specification for cellular systems in terms of HARQ timing.

A yet further advantage according to embodiments herein is a simple and flexible implementation for a network to control the ratio of cellular and D2D devices.

BRIEF DESCRIPTION OF THE DRAWINGS

Examples of embodiments herein are described in more detail with reference to attached drawings in which.

DETAILED DESCRIPTION

Figure 1:
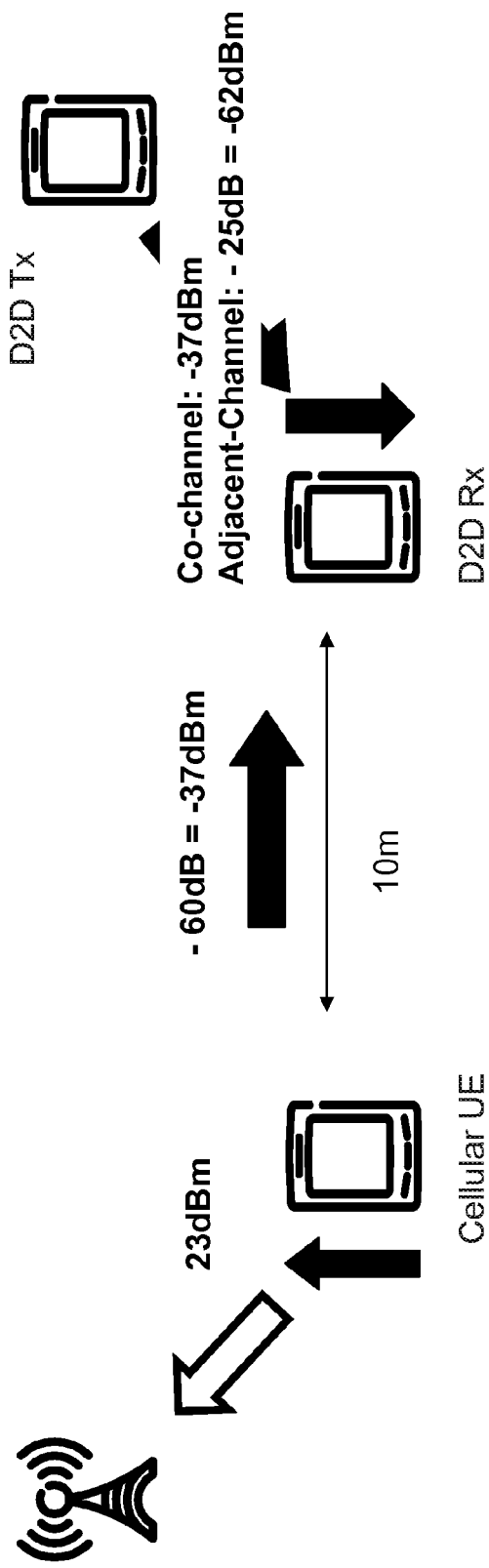
FIG. 1 is a schematic depiction of an effect of in-band emission.
Figure 2:
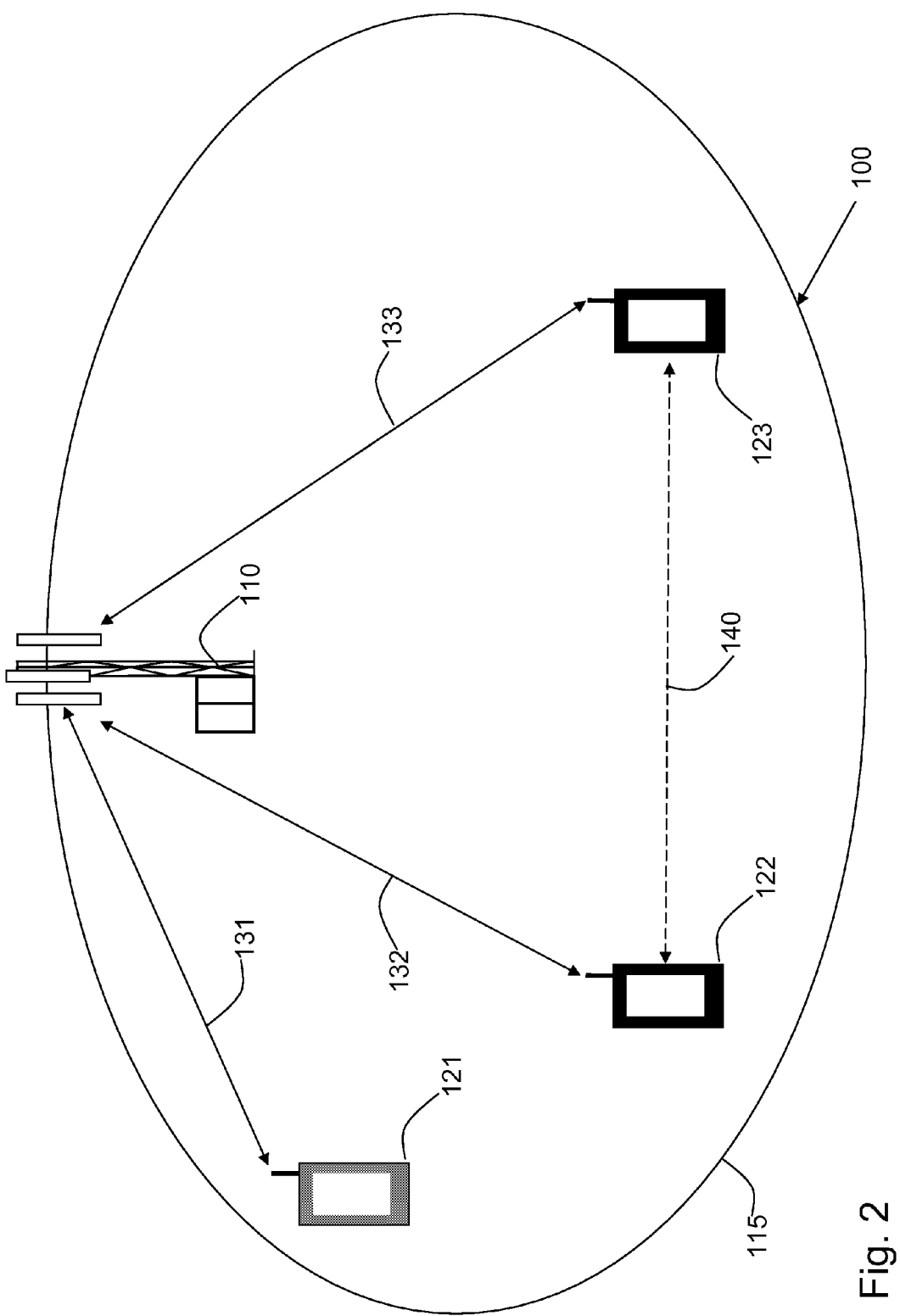
FIG. 2 is a schematic block diagram illustrating embodiments in a wireless communications system.

FIG. 2 depicts a mixed wireless network 100 in which embodiments herein may be implemented. The mixed wireless network 100 is a wireless communication network such as an LTE, Wideband Code Division Multiple Access (WCDMA) Global System for Mobile Communications (GSM) network, any 3GPP cellular network, any 3GPP2 cellular network, a Worldwide Interoperability for Microwave Access (WiMAX) network, a WiFi network, or any wireless network or system.

Mixed wireless network 100 comprises a cellular network and a D2D network.

The mixed wireless network 100 comprises a network node 110. The network node 110 may be a base station such as e.g. an eNB, eNodeB, or a Home Node B, a Home eNode B, femto Base Station, BS, pico BS or any other network unit capable to serve a device or a machine type communication device in a mixed wireless network 100. In some particular embodiments, network node 110 may be a stationary relay node, a mobile relay node, or a device, such as a user equipment. The mixed wireless network 100 covers a geographical area which is divided into cell areas, wherein each cell area is served by a network node, although, one network node may serve one or several cells. In the example depicted in FIG. 2, wherein the network node 110 is a base station, the network node 110 serves a cell 115. The network node 110 may be of different classes such as e.g. macro eNodeB, home eNodeB or pico base station, based on transmission power and thereby also cell size. Typically, mixed wireless network 100 may comprise more cells similar to 115, served by their respective network nodes. This is not depicted in FIG. 2 for the sake of simplicity. The network node 110 may support one or several communication technologies, and its name will depend on the technology and terminology used. In 3GPP LTE network nodes, which may be referred to as eNodeBs or even eNBs, may be directly connected to one or more core networks.

Mixed wireless network 100 also comprises at least a first device 121, a second device 122, and a third device 123, which are located within the cell 115. Any of the first device 121, the second device 122, or the third device 123 are wireless communication devices such as UE which are also known as e.g. mobile terminals, wireless terminals and/or mobile stations. Devices are wireless, i.e., they are enabled to communicate wirelessly in a wireless network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless network.

The devices 121, 122 and 123 may further be referred to as mobile telephones, cellular telephones, or laptops with wireless capability, just to mention some further examples. The devices 121, 122 and 123 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a D2D link and over a radio link in a cellular communications system. In some embodiments, the devices 121, 122 and 123 may further be referred to as network nodes.

The first device 121 is comprised in the cellular network and in some embodiments wherein the first device 121 is not the network node 110, it is configured to communicate within the mixed wireless network 100 via the network node 110 over a radio link 131, when the first device 121 is present in the cell 115 served by the network node 110.

In this example, the second device 122 and third device 123 are also located within the cell 115. However, in other embodiments, either the second device 122 and/or the third device 123 may be located in another cell which is in the neighbourhood of the cell 115, but within radio range of each other. The second device 122 and third device 123 are configured to communicate within the mixed wireless network 100 via the network node 110 or another network node serving the neighbouring cell, over radio links such as, e.g., a radio link 132, in some embodiments wherein the second device 122 is not the network node 110, and a radio link 133, in some embodiments wherein the third device 123 is not the network node 110, respectively, when the second device 122 and the third device 123 are present in the cell 115 served by the network node 110 or in the adjacent cell served by the other network node. The second device 122 and the third device 123 are also capable of communicating with each other, or other devices using wireless D2D communication over, for example, a D2D link 140, and are comprised in the D2D network.

Each of the devices 121, 122 and 123 may be configured to communicate using one of the cellular or D2D communication, or with both. However for the purposes of explanation, in the following discussion, the first wireless device 121 is understood to be using cellular communication and the second wireless device 122 and the third wireless device 123 are understood to be using D2D communication.

As mentioned earlier, in the mixed cellular and D2D wireless network 100, an inter-system interference problem arises from the co-existence of the cellular and D2D systems in the same network. The D2D communications may be located on cellular UL resources, which are typically characterized with lighter traffic.

In some embodiments, the D2D feature may be considered to be implemented based on a 3GPP Frequency-Division Duplexing (FDD) and a Time-Division Duplexing (TDD) LTE framework. As explained earlier, given the PHY channel structure in the LTE system described in the background section, the co-existence of the cellular and D2D systems in the same mixed wireless network 100 may result in two types of interference: 1) co-RB interference, i.e., interference on the same RB; and 2) inter-RB interference due to in-band emission, i.e., the interference from allocated RBs to unallocated RBs, within the band in the time dimension.

Thus, a way to overcome the interference problem existing in a mixed wireless network 100 is needed, so that cellular and D2D communications may take place without too much interference. Embodiments herein aim to overcome this interference problem by designing the PHY channel for the mixed network so that co- and/or inter-channel interference are minimized or avoided.

In principle, and in order to solve the co-RB interference, i.e., interference on the same RB, problem, the network node 110 may pre-configure the devices to measure the interference and based on the measurement report from the devices, and schedule the devices accordingly, to avoid collision of cellular transmission and D2D reception. However, users may want to establish D2D communications at any time, while some of the cellular channels, such as the cellular Channel Quality Indicator (CQI), and Dedicated-Scheduling Request (D-SR) Physical Uplink Control Channel (PUCCH) channels, are prescheduled with a fixed timing and resource allocation, i.e., statically preconfigured. If the D2D communications are allowed to take place at any time, i.e. on any radio resources, they may collide with the transmissions that are statically preconfigured by the network, and the cellular transmissions, which are typically transmitted at higher power, may interfere with the D2D communications, which are typically transmitted with lower power. Therefore, the network node 110 may need to take this into account in order to avoid interference. The same scheduling may not be applied to all the channels. The scheduling may be tailored to the transmission characteristics of every channel, such as resource allocation and transmission power adjustment. For example, devices which are located in the center of cell 115, may be transmitting with lower power, and therefore causing less interference, than devices that are located in the off-center portions of the cell 115, which may cause higher interference. Transmission from devices that are located far-away from other devices, may also be received by a device with lower power than transmission from devices that are nearby, which may also cause higher interference. The network node 110 may then take these different transmission/reception characteristics into account when scheduling the different devices in the cell 115, as will be described later.

Figure 3:
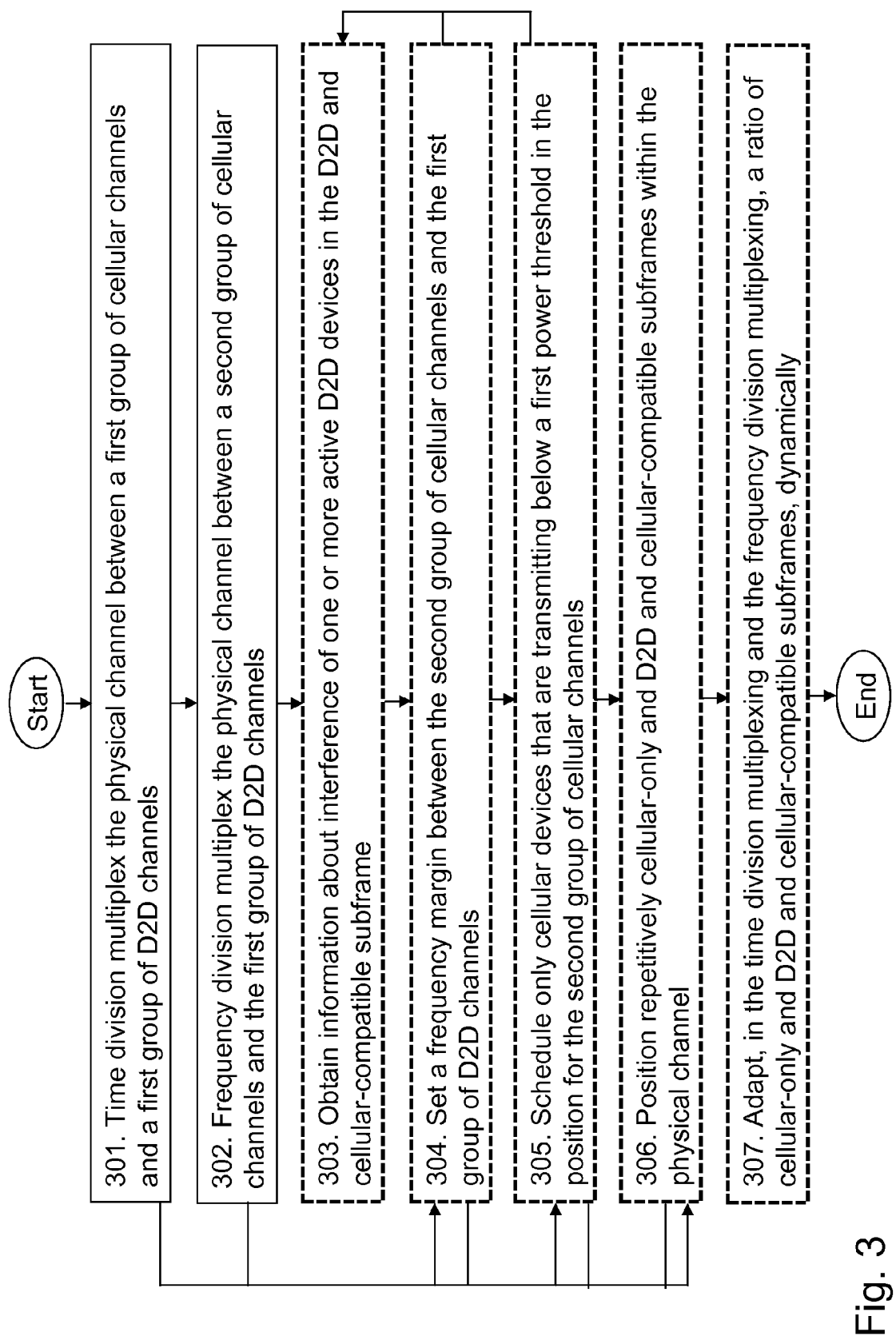
FIG. 3 is a flowchart depicting embodiments of a method in a network node.

Embodiments of a method in the network node 110 for multiplexing a physical channel between the network node 110 and the devices 121, 122, 123 will now be described with reference to the flowchart depicted in FIG. 3. As mentioned above, the network node 110 and the devices 121, 122, 123 are comprised in the mixed wireless network 100. The mixed wireless network 100 comprises the cellular network comprising one or more cellular channels and the D2D network comprises one or more D2D channels. The network node 110 may be one of: a base station, a stationary relay node, a mobile relay node, the first device 121, the second device 122, the third device 123 and a wireless device other than the first device 121, the second device 122 and the third device 123.

The method comprises the following actions, which actions may as well be carried out in another suitable order than that described below. In some embodiments, all the actions may be carried out, whereas in other embodiments only some action/s may be carried out.

Action 301

To handle the interference problem of the mixed wireless network 100, in this action, the network node 110 addresses the issue of the statically preconfigured channels. Due to fact that the interference caused by these channels varies over time, in accordance with their scheduling, interference management of these channels may require repeated reconfiguration and therefore high signaling overhead. In order to avoid this repeated reconfiguration, and therefore in order to save reconfiguration signaling overhead, the network node 110 schedules some of the cellular channels and some of the D2D channels at different times, so that they do not transmit at the same time and interfere with each other. Thus, in this action, the network node 110 performs time division multiplexing in the physical channel between a first group of cellular channels and a first group of D2D channels to avoid uncontrollable inter-channel interference. This is implemented jointly by downlink control signalling from the network node 110, e.g., by DCI (Downlink Control Indicator), MAC CE (Medium Access Control layer Control Element) and RRC (Radio Resource Control) signalling. In some embodiments, the first group of cellular channels may comprise one or more cellular channels that are prescheduled with a fixed timing and resource location. In some particular embodiments, the first group of cellular channels may comprise the PUCCH D-8R/CQL channel, and the first group of D2D channels may comprise a D2D Control Channel (DCCH) and a D2D Shared Channel (DSCH). In some particular embodiments, the first group of cellular channels 411,412 may further comprise a PUCCH Acknowledgement/Negative Acknowledgement (A/N) channel.

The DCCH, may be used by the D2D pair in a similar way as the cellular PUCCH, which may be used to carry Hybrid Automatic Retransmission Request (HARQ) Acknowledgement/Negative Acknowledgement (A/N) feedback, and the existing format of PUCCH design may be reused by the DCCH. The DSCH, is used by D2D in a similar way like cellular Physical Uplink Shared Channel (PUSCH) which may be used to carry D2D data transmission, in-band control signaling of HARQ A/N, CQI, Buffer Status Report (BSR) Power Head Room (PHR) and etc. . . .

Figure 4:
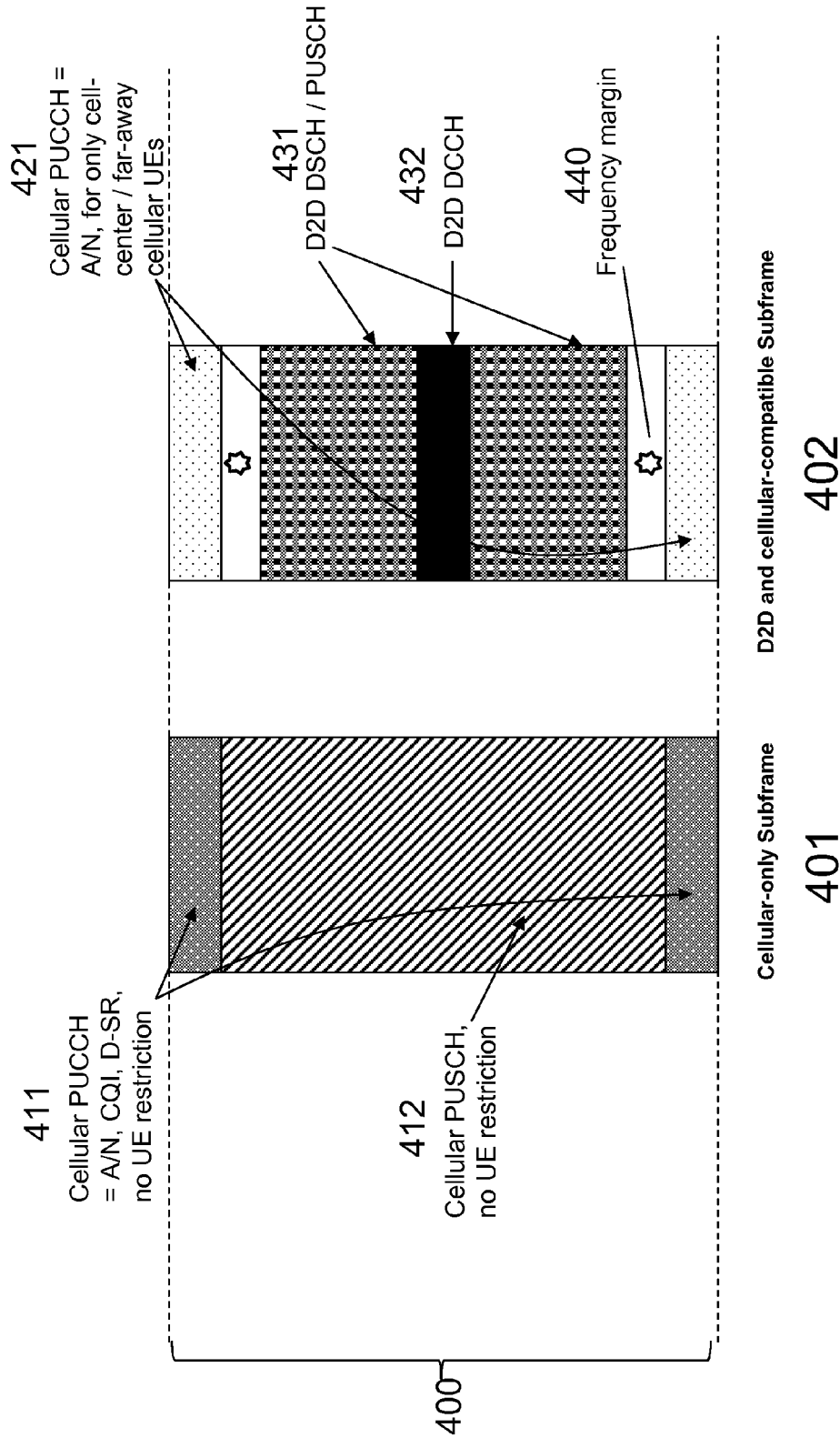
FIG. 4 is a schematic depiction of embodiments of frame structure of cellular-only and D2D compatible UL sub-frames.

The time division multiplexing between the first group of cellular channels and the first group of D2D channels to avoid inter-channel interference, may result in two types of UL subframe, i.e., a cellular-only subframe and a D2D and cellular-compatible subframe. This is depicted in a particular embodiment in FIG. 4, which shows a physical channel 400, a cellular-only subframe 401 and a D2D and cellular-compatible subframe 402, the first group of cellular channels 411, 412, a second group of cellular channels 421 and the first group of D2D channels 431, 432. The physical channel 400 is time division multiplexed between the first group of cellular channels 411, 412, which are associated with the cellular-only subframe 401, and the first group of D2D channels 431, 432, which are associated with the D2D and cellular-compatible subframe 402. As depicted, in the embodiment of FIG. 4, the first group of cellular channels 411, 412 comprises a cellular PUCCH D-SR/CQI, PUCCH A/N and a PUSCH, the second group of cellular channels 421 comprises a PUCCH A/N, and the first group of D2D channels 431, 432 comprises a DCCH and a DSCH. FIG. 4 will be described further down below.

The time division multiplexing between the first group of cellular channels and the first group of D2D channels provides a method to overcome the problem of in-band emission from statically preconfigured cellular transmission to D2D communications.

Action 302

For other channels that are not statically preconfigured, such as for example the cellular PUCCH A/N, the network node 110 may rely on the dynamic scheduling of channels in the mixed wireless network 100, such as the DL Physical Downlink Shared Channel (PDSCH) to coordinate the interference. This is because there is a fixed timing and resource location mapping relationship between PDSCH and uplink transmission of PUCCH for ACK/NACK feedback, i.e., 4 ms after the PDSCH on a specific resource location calculated based on the scheduling of PDSCH. Therefore, a way to avoid the interference from PUCCH, i.e., the ACK/NACK feedback, may be to restrict the downlink data transmission on PDSCH. Compared with CQI D-SR, it is actually not possible to achieve time division multiplexing with PUCCH A/N, since a HARQ A/N is triggered by the PDSCH in every DL subframe. For these channels, the network node 110 schedules some of the cellular channels and some of the D2D channels in different ranges of frequencies, so that they do not interfere by transmitting in each other's frequencies.

Thus, in this action, the network node 110 also performs frequency division multiplexing in the physical channel 400 between a second group of cellular channels 421 and the first group of D2D channels 431, 432, by controlling the resource allocation of both cellular uplink and D2D data transmission. In some embodiments, the second group of cellular channels 421 may comprise one or more cellular channels, such as a PUCCH A/N, channel, that are dependent on the signalling of another cellular channel. The first group of D2D channels 431, 432 is the same as that described above.

A mentioned earlier, in some embodiments, the time division multiplexing and frequency division multiplexing actions discussed above may result in a physical channel which may comprise two types of subframes: a cellular-only subframe 401 and a D2D and cellular-compatible subframe 402. The cellular-only subframe 401 is associated with the first group of cellular channels 411, 412, and the D2D and cellular-compatible subframe 402 is associated with the second group of cellular channels 421 and the first group of D2D channels 431, 432. In some embodiments, such as that depicted in FIG. 4, the cellular-only subframe 401 is the traditional cellular UL subframe, which may comprise cellular PUCCH and PUSCH, which are frequency division multiplexed, and the D2D and cellular-compatible subframe 402 may comprise cellular PUCCH A/N, and D2D DCCH and DSCH.

By allocating cellular devices, such as the first device 121, in the D2D and cellular-compatible subframes 402, the aim is to achieve high spectrum efficiency from reuse. This scheme may provide the possibility of resource reusing on D2D and cellular-compatible subframes 402. If this is not performed, D2D communications may use the resources in a dedicated way to avoid inter-system interference. However, in these embodiments, the reuse gain will be lower. In some particular embodiments, at least one of the first group of cellular channels 411, 412 and the second group of cellular channels 421 may further comprise a cellular PUSCH. However, in other embodiments, there may not be a cellular PUSCH in the D2D and cellular-compatible subframe 402. In these later embodiments, there may not be cellular devices reusing the resources with D2D communications.

Action 303

In some embodiments, for each cellular device 121 to be allocated or already allocated into the D2D and cellular-compatible subframe 402, the network node 110 may obtain information about interference of one or more active D2D devices 122, 123 in the D2D and cellular-compatible subframe 402 into which each cellular device 121 is to be allocated or is already allocated. This may be done, for example, by pre-configuring the D2D devices measurement on a set of cellular reference signals (RS). When any cellular RS may be identified as a high interference source, it may be reported to the network.

Figure 5:
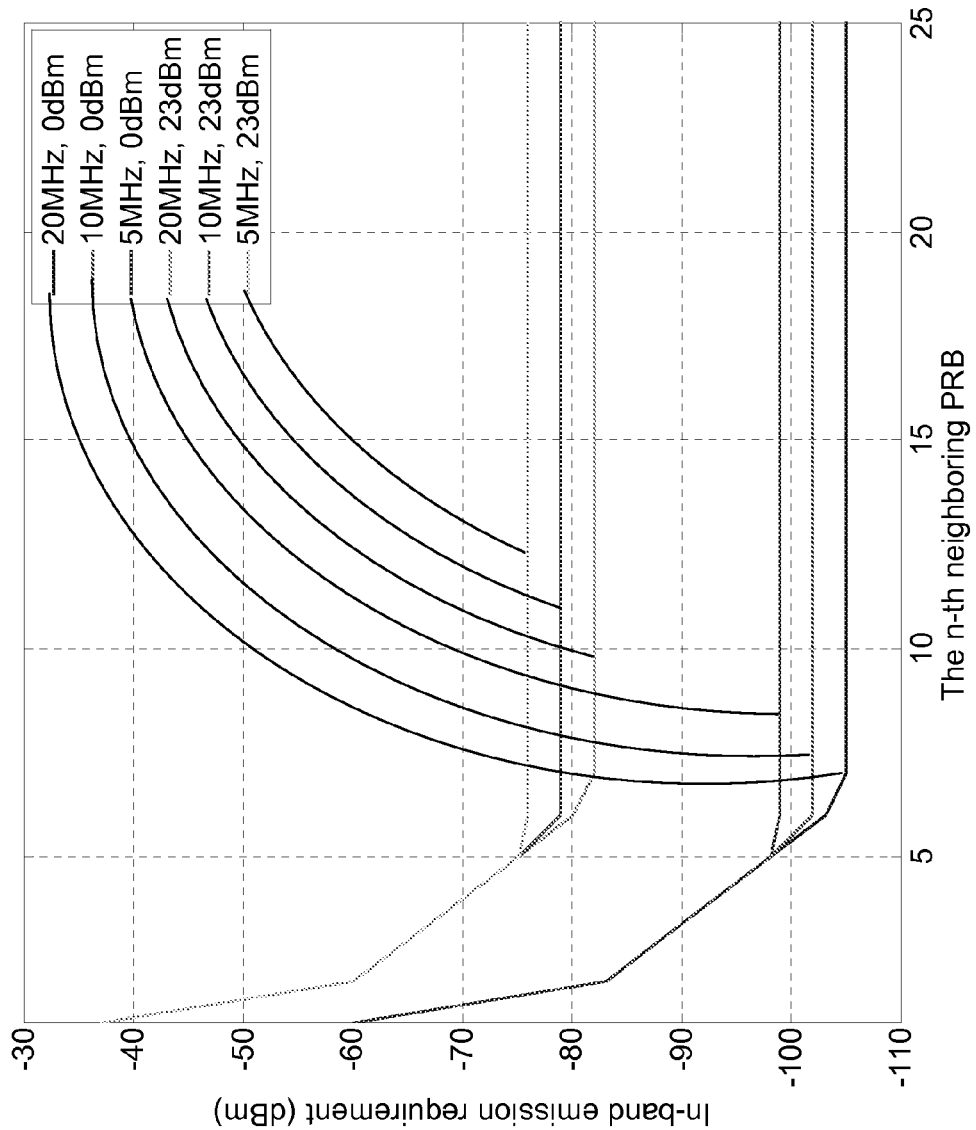
FIG. 5 is a graph the 3GPP requirement of in-band emission.

As mentioned earlier, the interference provoked by a channel may depend on the channel's transmission power. The transmission power varies from device to device, depending on their location within the cell 115. For example, devices which are located in the cell-center of cell 115, may be transmitting with lower power, and therefore, causing less interference, than devices that are located in the off-center portions of the cell 115, which may cause higher interference. Devices that are located far-away from other devices, may also be received with lower power, and therefore cause less interference, than devices that are nearby, which may cause higher interference. The network node 110 may then take these different transmission/reception characteristics into account when scheduling the different devices of the cell 115 in the D2D and cellular-compatible subframe 402. Therefore, to solve the in-band emission problem, the network node 110 may need to avoid scheduling D2D and nearby cellular devices in the neighboring RB in the same slot, not only the same RB. That is, the network node 110 may schedule only cell-center, i.e., low transmission power, cellular devices, in the same slot. For higher cellular transmission power, maximum 23 dBm for cellular devices, the interference level may be higher even for far-away neighboring RBs, e.g., around −80 dBm as shown in FIG. 5. Therefore, in other embodiments, the network node 110 may rely on the dynamic DL scheduling, in order to avoid a high-power channel in the D2D and cellular-compatible subframe. For example, it may not desirable that a device sends an A/N feedback in the 5-th UL subframe. The network node 110 has no UL scheduling control, since the A/N timing and location is one-to-one mapped to the DL data. However, the network node 110 may control the DL scheduling, and force the DL scheduling so that the device is not scheduled in the 1st DL subframe, so that no device is scheduled in 5th UL subframe. The network node 110 may determine which interference level is acceptable for D2D communications. This level will set the threshold above which interference may be too high for D2D communication and therefore, the network node 110 may need to schedule the devices accordingly in the D2D and cellular-compatible subframe. This threshold may be determined, for example, by A, the target SINR, signal to interference and noise ratio, of D2D communication, and B, the achieved D2D signal power, also taking into account of C, the inter-frequency loss ratio of interference jointly, as B*C/A.

In some embodiments, for each cellular device, such as the first cellular device 121, to be allocated into the D2D and cellular-compatible subframe 402, all active D2D devices 122, 123 may have to detect the interference in advance to avoid co- or inter-channel interference, and then send this information to the network node 110. In other embodiments, it may be the network node 110 itself that measures the inter-channel interference from D2D devices 122, 123. This may be done by interference measurement by all active D2D devices 122, 123 in the D2D and cellular-compatible subframe 402, then the D2D device who detects unacceptable co-or inter-channel interference, i.e., interference above the interference threshold, may report to the network node 110. This interference safety level or threshold may be different for co- and inter-channel interference, considering the in-band emission, so that the interference report may indicate that the co-channel interference is harmful, but the inter-channel interference is acceptable.

Thus, in some embodiments, obtaining information about interference comprises one of: measuring the interference, and receiving the information about interference from at least one of the D2D devices 122, 123. This may be implemented by pre-configuring a Radio Resource Management (RRM) measurement and report mechanism of the devices 122, 123 via RRC signalling, then as long as the trigger condition may be satisfied, i.e., some threshold value may be achieved, a large path-loss between a network node and the device, when the signal of the neighboring cell is above a specific level, etc., the device 122, 123 may send a measurement report to the network node 110.

In some embodiments, the cellular and D2D devices causing interference due to location or power of transmission, may be known by the network by analyzing when a PHR report from one of the cellular devices indicates that a room for device power boosting is above a certain threshold. The PHR is an index reported by a device to indicate an estimated power headroom, i.e., a difference between a nominal device maximum transmit power and the estimated power for PUSCH transmission in the current subframe, expressed in dB.

In other embodiments, the potential interference of the devices may be determined by location or positioning methods. Thus, in some embodiments, the devices transmitting below a first power threshold, such as cell-center devices and devices far-away from D2D devices 122, 123, may be detected by reporting their locations to the network node 110 by a positioning sensor such as a Global Positioning System (GPS).

In some embodiments, this/these measurement/s may be carried out by D2D devices, such as 122 and 123. Relying on GPS and the PHR involves lower signalling overhead in comparison with measurement reports. Therefore, in some embodiments where the network node 110 may just want to identify the cell-center devices, i.e., a subset of the low-interference devices, it may just rely on GPS and/or PHR.

Action 304

The scheduling of cellular and D2D channels in the D2D and cellular-compatible subframe 402 may result in an inter-RB, i.e., in-band, interference problem, as explained above in the background section, due to the high-power of transmission of the cellular channels allocated near the frequency of transmission of the low-power of transmission D2D channels. Some frequency separation, i.e., margin, may be allowed to overcome this problem between the allocation of the high-power of transmission cellular channels and the low-power of transmission D2D channels in the D2D and cellular-compatible subframe 402. That is, to not allocate a certain frequency range to any channels.

Therefore, in some embodiments, the network node 110 may set a frequency margin 440, such as an RB margin, between the second group of cellular channels 421 and the first group of D2D channels 431, 432 to avoid in-band interference. This may be achieved by controlling the resource allocation of both cellular uplink and D2D data transmission. So the network node 110 may schedule the second group of cellular channels 421 and the first group of D2D channels 431, 432 in two allocations, with a sufficiently large margin in-between the two to avoid, or reduce, inter-frequency interference. The larger the margin in-between is, the less inter-frequency interference the second group of cellular channels 421 and the first group of D2D channels 431, 432 may cause to each other.

In some embodiments, an RB margin may be used to avoid the interference from channels in the second group of cellular channels 421, such as the PUCCH A/N.

In some embodiments, for the example as that shown in FIG. 4, the D2D DCCH may be allocated in the band center, to provide the largest RB margin 440 from the cellular PUCCH, which is located on the outer segments of the subframe.

The question then arises as to how large may the RB margin 440 be in order to avoid interference between the channels allocated in the D2D and cellular-compatible subframe 402. As shown in FIG. 5, according to the 3GPP requirement, for a 20 MHz LTE system, a 0 dBm cellular UL Binary Phase-Shift Keying/Quadrature Phase-Shift Keying, BPSK/QPSK, transmission may restrict the in-band interference to different levels to neighboring RBs, but maintain a stable level from the 7-th RB. Thus, an RB margin of 7 RBs may ensure that the in-band emission stays at −105 dBm, which is acceptable for D2D communication.

Thus, in some embodiments, the RB margin 440 set between the channels of the D2D and cellular-compatible subframe 402 may comprise 7 or more RBs. In some particular embodiments, the RB margin 440 may be 7 RBs.

In some embodiments, the setting of the RB margin 440 may be dynamic, based on interference avoidance. That is, it may or it may not be used, based on whether the obtained interference is above or below the interference threshold described earlier. In other words, if the inter-RB interference is measured as acceptable even for the nearest RB, e.g., −105 dBm, then there may be no need for such RB margin 440. For example, in some embodiments, the location of the cellular PUSCH and the D2D DSCH may be decided dynamically by the network node 110 considering interference avoidance, i.e., they may not be necessarily separated by the RB margin 440. Thus, in some embodiments, the setting of the frequency margin 440 may be performed when the obtained information about interference is above the interference threshold.

Action 305

As explained earlier, in some embodiments, co-channel and inter-channel interference measurement may be required in order to carry out scheduling and resource reuse in the D2D and cellular-compatible subframe 402.

In the embodiments where interference information is obtained by the network node 110, co-scheduling, namely, pairing of safe cellular devices such as the first device 121 and the D2D devices 122, 123 may continue until an interference report from either D2D devices 122, 123 or the network node 110 itself points out that the interference becomes unacceptable, i.e., above the interference threshold, for example, due to device mobility. Then, the interfering cellular device or the interfered D2D device may be dropped out of the co-scheduling group, and be scheduled in the cellular-only subframe 401 or the D2D and cellular-compatible subframe 402.

Thus, one way of overcoming the in-band interference problem is to restrict the allocation of cellular devices, such as the first device 121, in the D2D and cellular-compatible subframe 402 based on transmission power. For example, only cell-center devices, i.e., low transmitting power devices, may be allowed in their respective position in the D2D and cellular-compatible subframe 402. In these embodiments, there may be a RB margin 440, such as that described earlier, between, for example, the cellular PUCCH and the D2D DSCH and/or DCCH. Another option is that the cellular devices which are far from the D2D devices, i.e., may be also cell-edge, and may be implemented by GPS assistance, or pathloss/interference measurement by, for example, D2D devices, may be scheduled in the corresponding DL subframe. In these embodiments, there may be a smaller or no RB margin 440.

The first option may be easier to implement than the second, since the latter relies on D2D devices measurement which may cause more signalling overhead, but it may result in a restriction of the D2D RB usage to some extent, due to the usage of the RB margin 440, for the purposes of transmission. Both options may depend on the scheduling implementation and may be time-varying. In some embodiments in which the cellular PUSCH is detected as causing acceptable interference by D2D measurement, it may be located at the RB margin 440 space, so that still all the RBs may be used.

In this action and in base of the foregoing, in some embodiments wherein the D2D and cellular-compatible subframe 402 has a position for the second group of cellular channels 421, the network node 110 may schedule only cellular devices 121 that are transmitting below a first power threshold in the position for the second group of cellular channels 421. The first power threshold is that, underneath which the interference caused is acceptable by D2D measurement, i.e., below the interference threshold described above.

In other embodiments, the network node 110 may rely on dynamic DL scheduling to avoid the corresponding high-power A/N in the D2D and cellular-compatible subframe, since the timing relationship between DL PDSCH and UL HARQ A/N is fixed in the current 3GPP LTE system, so the network node 110 may need to work around this fixed relationship and schedule the remaining channels according to the potential interferences.

In some particular embodiments, in order to avoid harmful interference from PUCCH A/N to the frequency division multiplexed D2D DCCH/DSCH in the D2D and cellular-compatible subframe 402, only cell-center cellular devices, i.e., low transmission power cellular devices, may be scheduled in the corresponding DL PDSCH position.

Thus, in some embodiments, the network node 110 may decide a location in the physical channel of the cellular and the D2D channels dynamically, based on interference avoidance. That is, the network node 110 may decide a frequency and/or time interval, i.e., a position. In the D2D and cellular-compatible subframe 402 of the cellular and the D2D channels dynamically, based on the obtained information about interference, so that the obtained information about interference is within a determined interference threshold, such as the interference threshold described earlier. For example, if the interference from PUCCH at band-edge is high, then the network node 110 may need to allocate D2D channels at band-center with some frequency margin in-between to alleviate the interference. Otherwise no resource margin may be need. Another example may be, for cellular data transmission of PUSCH, if there are already multiple D2D devices using different resources, the network node 110 may let the cellular PUSCH reuse the resources with D2D devices, but it should select the D2D device for which no harmful interference would be caused by this cellular device. In some particular embodiments, the cellular channel whose frequency and/or time interval in the D2D and cellular-compatible subframe 402 may be decided dynamically may be the PUSCH channel and the D2D channel may be the DSCH channel. The dynamic decision is carried out to avoid interference, and the trigger is the interference relationship, which information is obtained by the network, relying, in some embodiments, on a measurement report from D2D devices 122, 123.

In the embodiments in which the DCCH is located at band-center, it may cause the problem to the localized scheduling of cellular UL transmission, which originally may be designed for continuous RB allocation. However, considering embodiments using the release-10 LTE, where multi-cluster PUSCH transmission for cellular devices 121 is allowed, i.e., the cellular UL transmission does not need to be on continuous RBs, the D2D DCCH in the band center may cause little problem for the scheduling.

Without inter-system interference information, the most robust way to overcome the interference problem may be to locate cellular transmission in the cellular-only subframe 401, and locate D2D transmission in the D2D and cellular-compatible subframe 402 without cellular PUSCH, but with RB margin 440 from PUCCH.

As explained in the preceding action, in some embodiments, in order to avoid harmful interference from some high power of transmission channels, such as the PUCCH A/N, to lower power of transmission channels such as the frequency division multiplexed D2D DCCH/DSCH in the D2D and cellular-compatible subframe, only cell-center cellular devices may be scheduled in the corresponding DL PDSCH position. In some embodiments, no scheduling restriction may be needed in the corresponding DL PDSCH position in the cellular-only UL subframe, since no D2D channels may be allocated there and there may be no need to consider the inter-system interference to avoid.

Therefore, in some embodiments, scheduling by the network node 110 for cellular devices 121 in the cellular-only subframe 401 may be unrestricted.

The foregoing discussion has focused on the description of the UL subframes, where the D2D channels may typically be allocated. Similar scheduling actions may be taken by the network node 110 on DL subframes, which will not be repeated here for the sake of simplicity.

Figure 6:
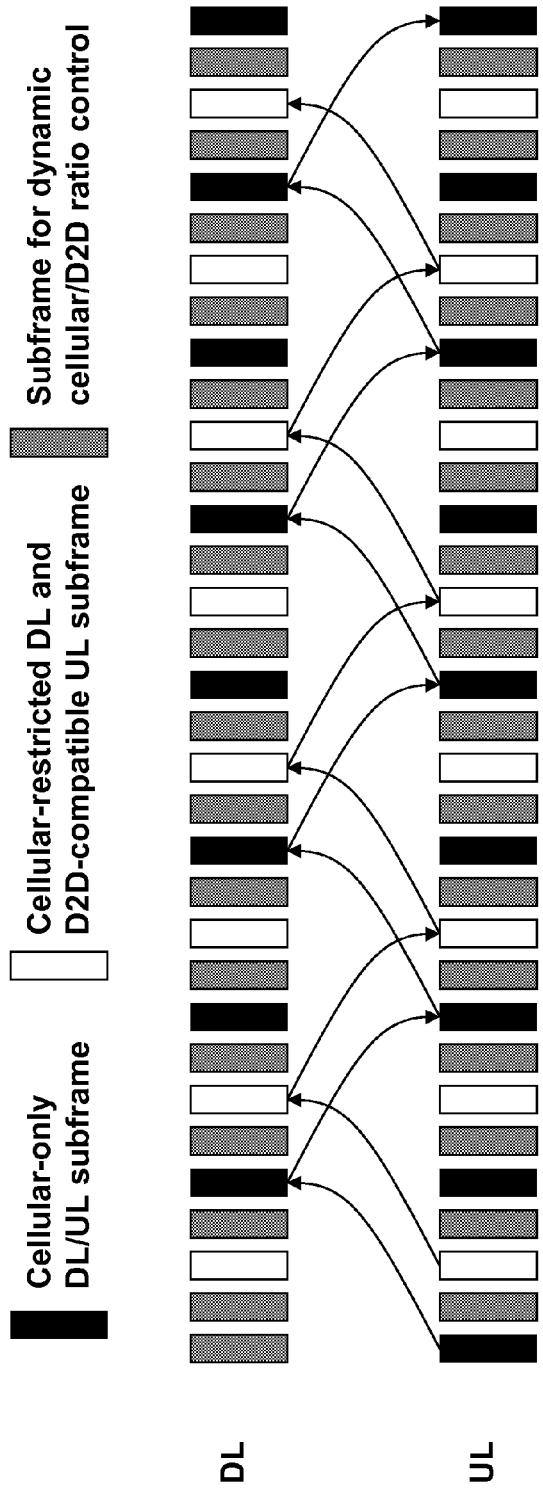
FIG. 6 is a schematic diagram illustrating embodiments of a PHY channel design.

As a result of actions 301-305 just described, and in order to avoid interference from high power transmissions, such as from the PUCCH A/N cellular channel to the lower power of transmission D2D communications, in mixed wireless network 100, a subframe mapping relationship of DL and UL subframe types, such as that depicted in the embodiment of FIG. 6, may take place. This mapping may be between the data transmission on PDSCH and the ACK/NACK feedback on PUCCH, which is a fixed timing/location mapping by the 3GPP specifications. In FIG. 6, cellular-only DL/UL subframes 401 are depicted in black, where no cellular device restriction is required. D2D and cellular-compatible DL/UL subframes 402 are depicted in white, where only cell-center/far-away cellular devices may be scheduled in DL subframe. Cellular devices causing no/acceptable co-/inter-channel interference may be scheduled in UL subframe in a FDD LTE system. In an FDD system, the transmitter and receiver operate at different carrier frequencies. Patterned subframes may be cellular-only 401 or D2D and cellular-compatible subframes 402, depending on traffic, as explained later, in actions 306 and 307. For the TDD system, since the DL and UL resources are on the same carrier frequency, the subframe pattern design has to take into account the TDD configuration of the system as well.

In some embodiments, the co-/inter-RB interference measurement described in Action 303 may continue during the data transmission procedure, where the information of cellular device reference signal (RS) configuration may be necessary. This information may be sent by the network node 110 to the D2D devices 122,123, in order to measure the specific RSs, so that the harmful interfering cellular devices may be identified, which may be later reported by the D2D devices to the network node 110. In some embodiments, this interference measurement/report may not be at the co-RB cellular device, but at inter-RB cellular device, so this may cause a signaling overhead considering the full dynamic scheduling of cellular devices. While co-RB interference concerns the cellular devices 121 reusing the same resources, for inter-RB interference, all the cellular devices 121 on the same time slot may have to be monitored, which represents an increment in signaling overhead. Therefore, in some embodiments, in order to reduce signaling overhead, a semi-persistent scheduling of cellular devices 121 on the D2D and cellular-compatible subframes 402 may be employed, i.e., the cellular RS information may not change a lot during the data transmission procedure. The semi-persistent scheduling may be defined as a semi-static scheduling scheme, i.e., the resource scheduling may repeat periodically on the same resource set.

Action 306

In this action, the network node 110 may position repetitively cellular-only 401 and D2D and cellular-compatible subframes 402 within the physical channel 400, with specific resource periodicity. For example, it could repeat every 8 ms, in order to co-exist with the traditional FDD cellular HARQ process. All of these depend on the corresponding scheduler implementation, i.e., on the time when a device 121, 122, 123 may receive a resource grant.

In some embodiments, the network node 110 may position repetitively the cellular-only 401 and D2D and cellular-compatible subframes 402 within the physical channel 400 with a timing pattern, which is based on a HARQ timing of the cellular network.

One factor to take into account when designing a PHY channel 400 in a mixed wireless network 100 is the timing of the cellular system HARQ for both FDD and Time-division duplexing (TDD) systems. HARQ is the simultaneous combination of Automatic Retransmission request (ARQ), and Forward Error Correction (FEC). It enables the overhead of error correction to be adapted dynamically depending on the channel quality. When HARQ is used, if the errors may be corrected by FEC, then no retransmission is requested; if the errors may be detected but not corrected, a retransmission is requested. TDD is the application of time-division multiplexing to separate outward and return signals. Compared with the FDD system, where the HARQ timing is more simplified, the HARQ timing for the TDD system is TDD configuration specific and thus more complicated.

Figure 7:
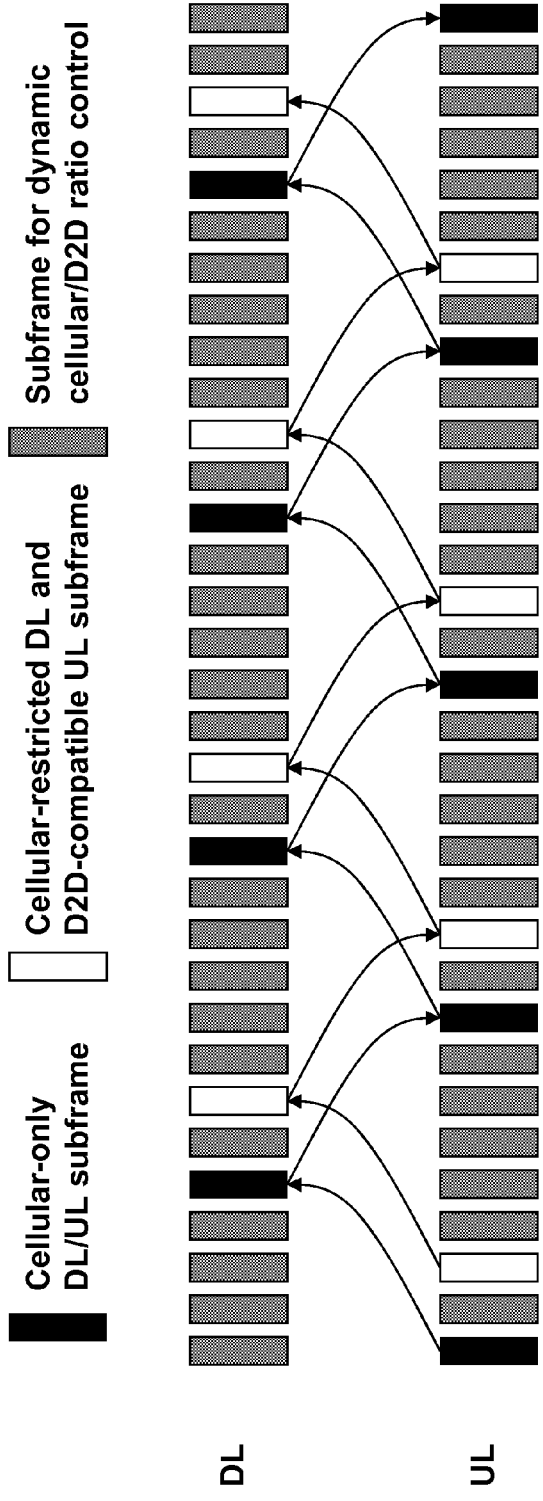
FIG. 7 is a schematic diagram illustrating embodiments of a PHY channel design.
Figure 8:
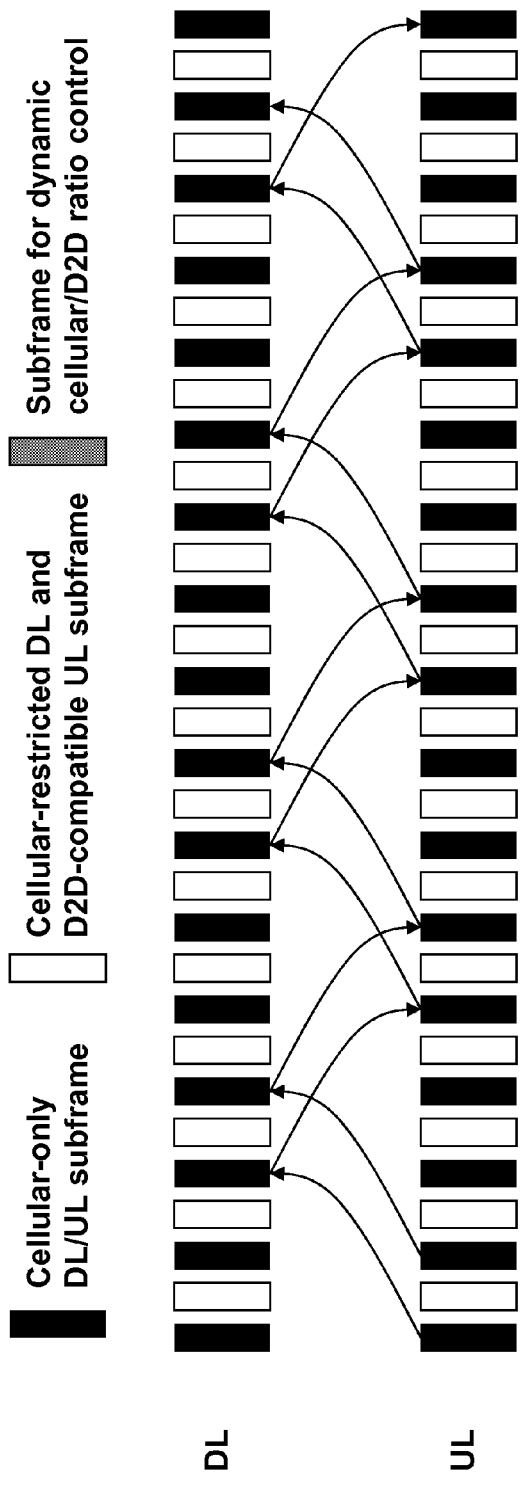
FIG. 8 is a schematic diagram illustrating embodiments of a PHY channel design.

According to the current 3GPP FDD LTE specification, the UL HARQ is implemented in a synchronous way, i.e., a new UL transmission in the n-th Transmission Time Interval (TTI) may be ACK/NACKed by the DL in the n+4 subframe, and it may cause a re-transmission in the n+8 subframe, in the FDD system. Thus, if the allocation of cellular-only and D2D and cellular-compatible subframes 401, 402 may be designed for backwards compatibility with the timing of the cellular system HARQ for both FDD and the TDD systems, the cellular-only subframe may be repeated at least every 8 subframes. Given this pattern of repetition of every n+8 subframe dictated by the current 3GPP FDD LTE specification, the network node 110 may dynamically schedule the remaining 7 subframes in-between the first and n+8 subframes. Thus, a repeating pattern for cellular-only subframes of every 8, 4, or 2 subframes may be appropriate, as illustrated in FIGS. 6-8, where the arrows denote the relationship between the Physical HARQ Indicator channel (PHICH)-PUSCH and PUSCH-PHICH timing relationship, and it is similar for FIGS. 6-14. The D2D system HARQ timing may then adapt to the different repetition factor.

The repetition factor of every 4 subframes, as shown in the embodiment of FIG. 6, may be associated with a number of advantages and a number of disadvantages.

Figure 15:
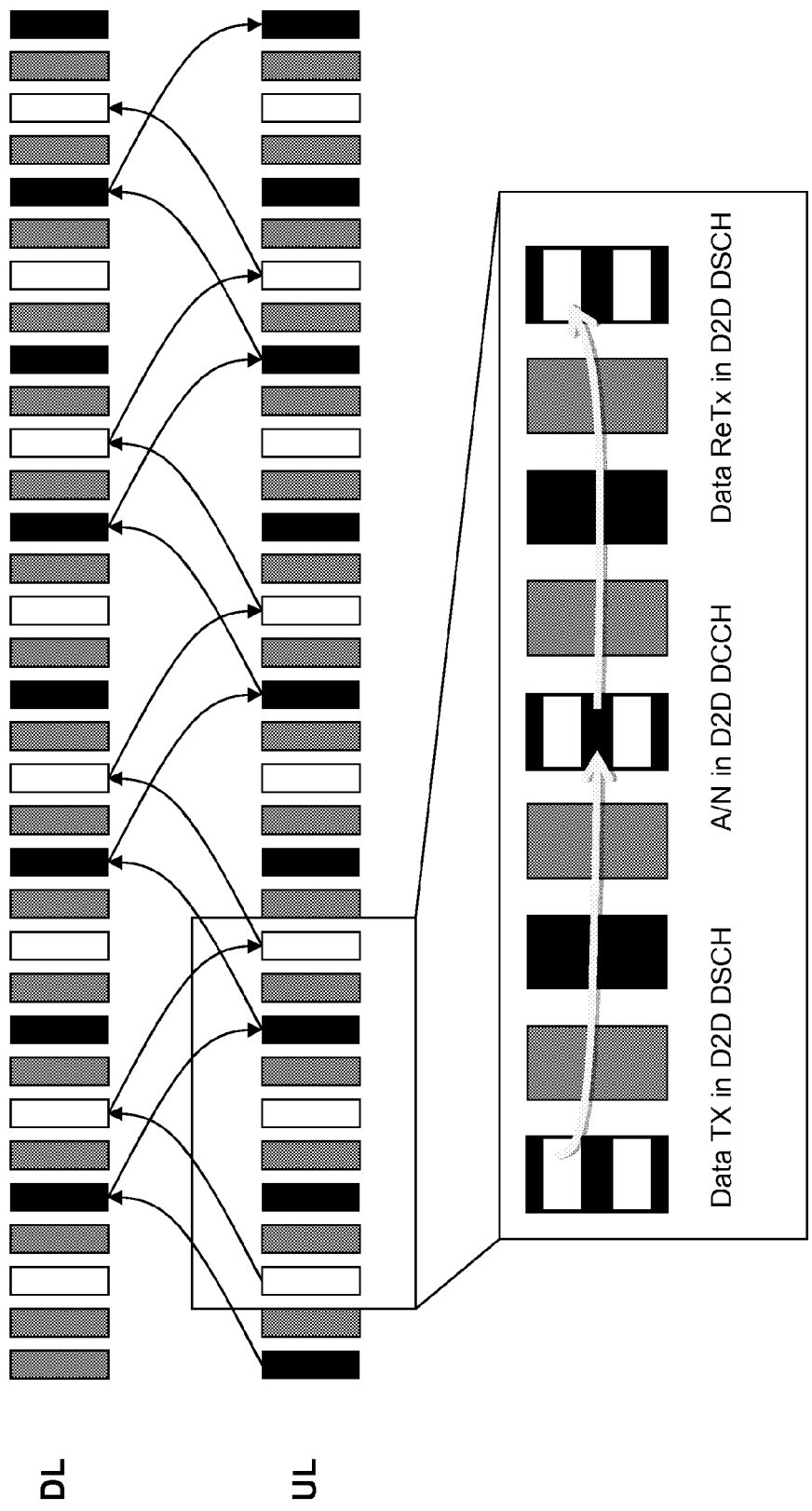
FIG. 15 is a schematic diagram illustrating embodiments of a D2D HARQ timing.

Among the advantages of a repetition factor of 4 are that the D2D may implement a similar HARQ timing as shown in FIG. 15, i.e., the new transmission in the n-th TTI is feedback by A/N in the n+4 subframe on DCCH, following by a possible re-transmission in the n+8 subframe. In other words, each n-th D2D and cellular-compatible subframe includes A/N for the n+4 subframe, new transmission in the n-th subframe and re-transmission for the n+8 subframe.

Among the disadvantages of a repetition factor of 4 are that for the cellular system, the PUCCH periodicity may be only configured as 4× subframes, e.g., 20 ms, which may be however acceptable for D-SR according to an on-going study of 3GPP Rel-11 eDDA WI. Compared with the repetition factor of 8, where the D-SR periodicity may only be 40 ms at least, the periodicity of a smaller D-SR may be beneficial for the network to be kept updated on the DL channel quality in a timely way.

In the embodiments in which the repetition factor may be every 8 subframes, as shown in FIG. 7, the D2D may have to implement an extended HARQ timing, i.e., the n-th subframe may only be mapped to A/N in the n+8 subframe, and a re-transmission may be further extended to the n+16 subframe. In other words, the number of HARQ processes may be extended. These embodiments may be associated with a number of advantages and a number of disadvantages.

Among the advantages of a repetition factor of 8 are that this option provides more flexibility of cellular/D2D ratio control. That is, the network node 110 may have 7 frames to dynamically allocate for cellular-only or D2D and cellular-compatible subframes, as opposed to the 3 frames that may be available with a repetition factor of 4.

As stated above, among the disadvantages of a repetition factor of 8 are that a larger PUCCH periodicity of 8× subframes may have to be used, e.g., 40 ms, which may be however acceptable for D-SR according to on-going study of 3GPP Rel-11 eDDA WI.

In the embodiments in which the repetition factor may be every 2 subframes, as shown in FIG. 8, the conventional HARQ timing may be implemented by D2D in a similar way. These embodiments may be associated with a number of advantages and a number of disadvantages.

Among the advantages of a repetition factor of 2 are that it may provide more options when set PUCCH D-SR periodicity, i.e., in the number of 2n, n is an integer. Almost all existing D-SR periodicity options in the existing LTE network may be applied here, compared with the repetition factor of 4 or 8, where the periodicity may be restricted in some extent.

Among the disadvantages of a repetition factor of 2 are that the ratio of cellular-only and D2D and cellular-compatible subframes 401, 402 may be fixed as 1:1. That is, the network node 110 may not have any frames to dynamically allocate for cellular-only or D2D and cellular-compatible subframes 401, 402, as opposed to the 3 frames that may be available with a repetition factor of 4 and the 7 frames that may be available with a repetition factor of 8.

Figure 9:
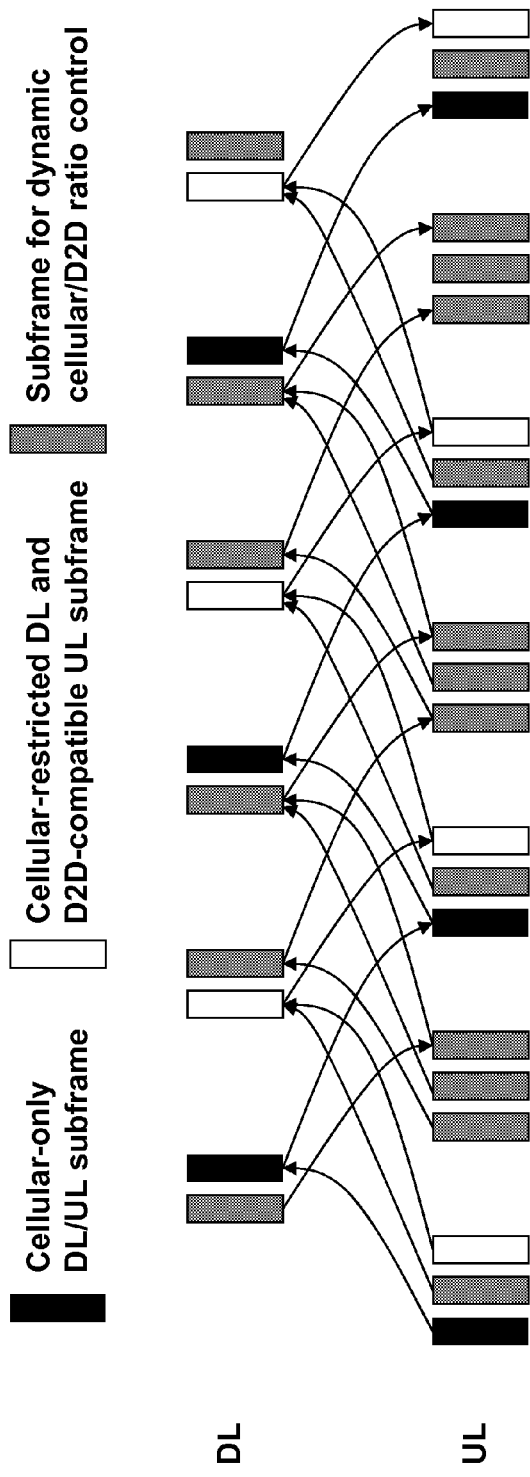
FIG. 9 is a schematic diagram illustrating embodiments of a PHY channel design.
Figure 10:
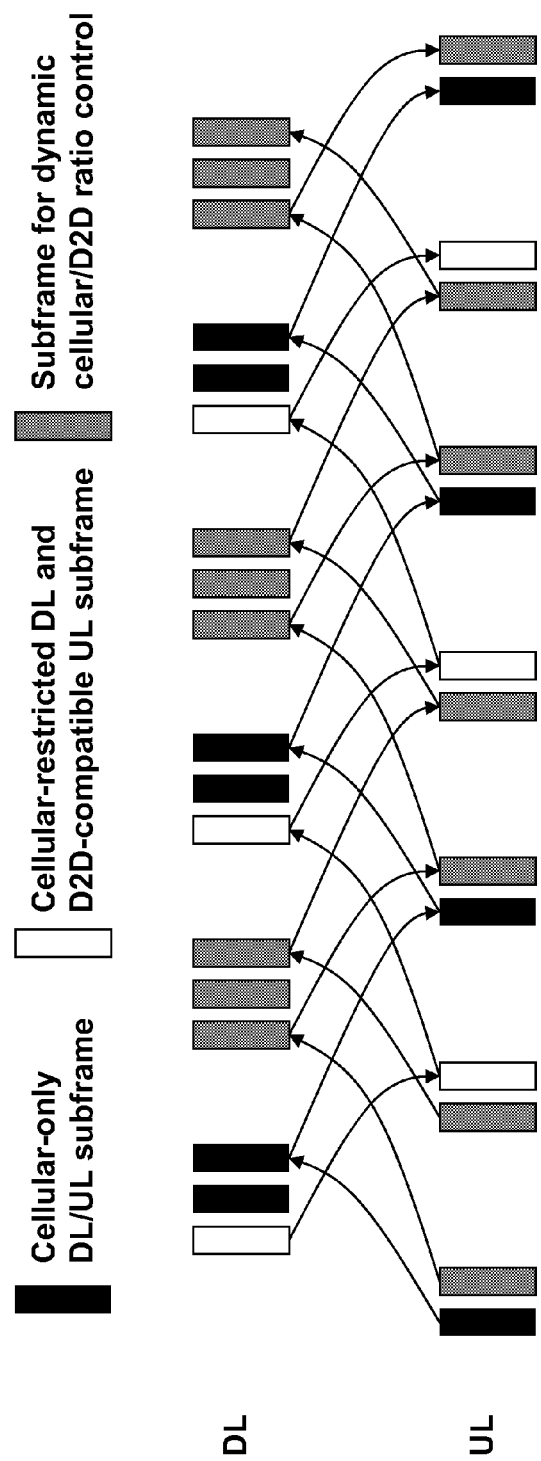
FIG. 10 is a schematic diagram illustrating embodiments of a PHY channel design.
Figure 11:
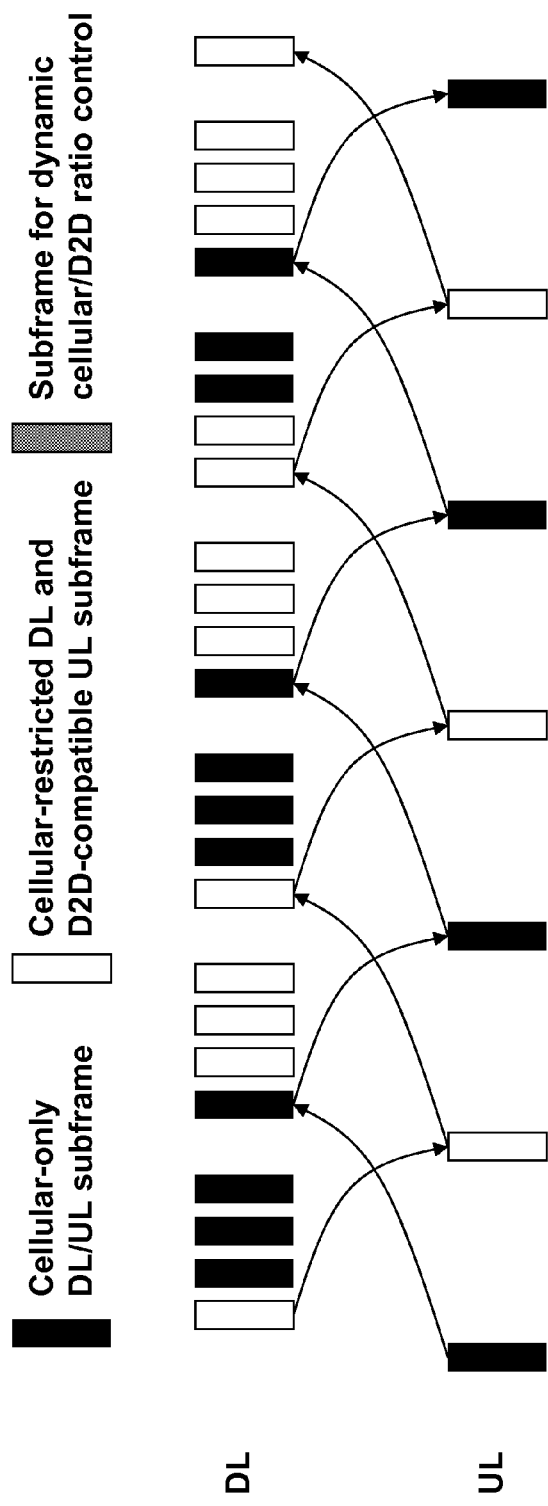
FIG. 11 is a schematic diagram illustrating embodiments of a PHY channel design.
Figure 12:
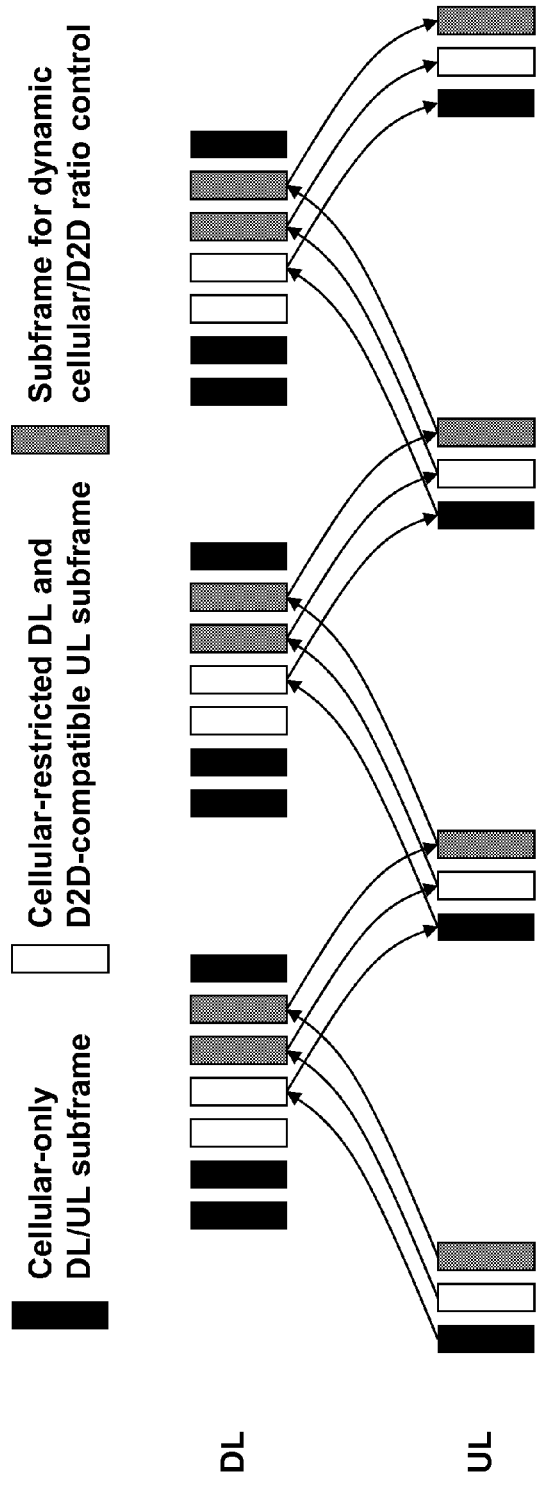
FIG. 12 is a schematic diagram illustrating embodiments of a PHY channel design.
Figure 13:
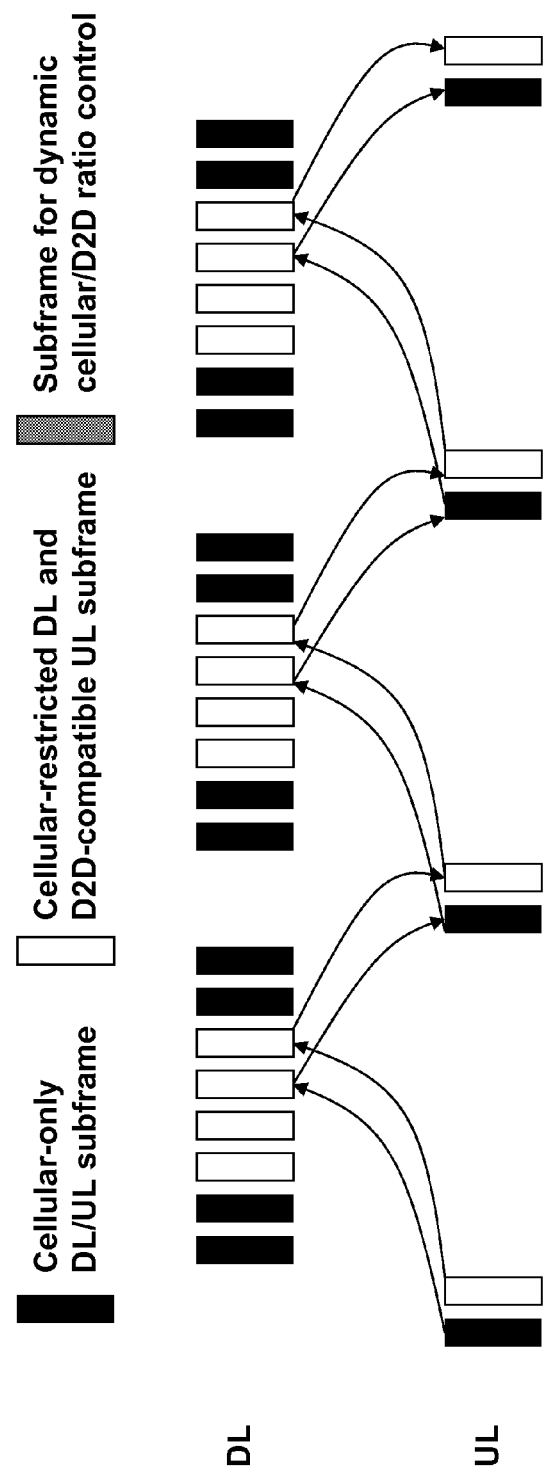
FIG. 13 is a schematic diagram illustrating embodiments of a PHY channel design.
Figure 14:
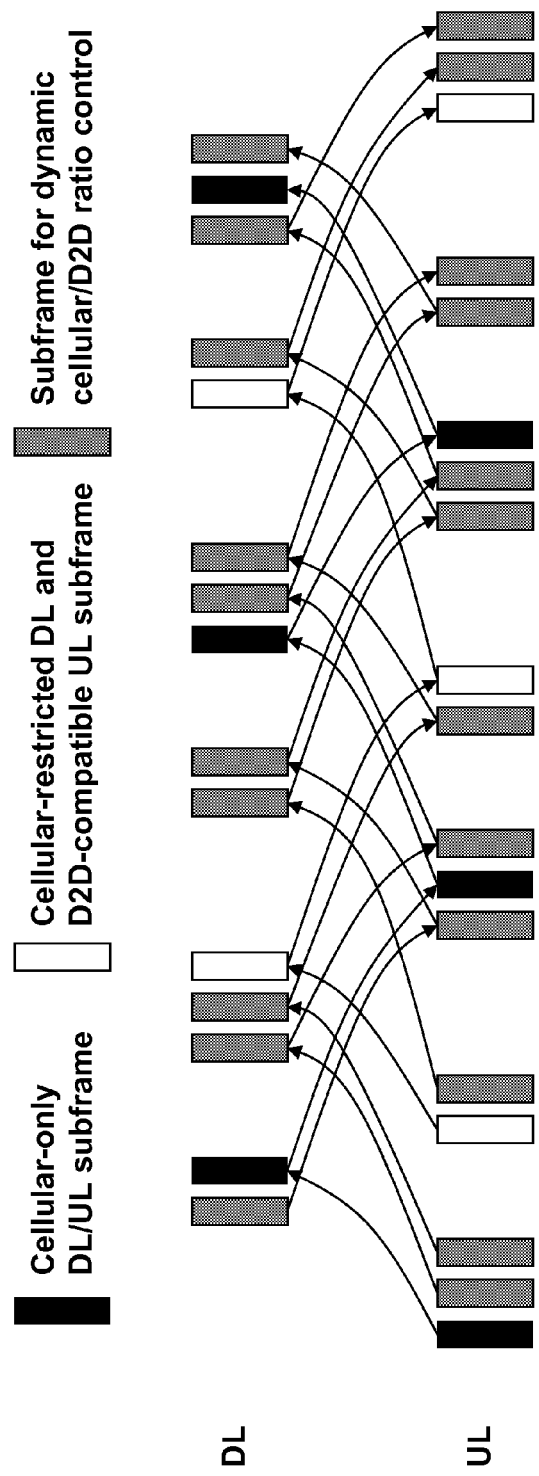
FIG. 14 is a schematic diagram illustrating embodiments of a PHY channel design.

A similar design may be extended to TDD system, as is shown in FIG. 9 for a TDD configuration 0, in FIG. 10 for a TDD configuration 1, in FIG. 11 for a TDD configuration 2, in FIG. 12 for a TDD configuration 3, in FIG. 13 for a TDD configuration 4, in FIG. 14 for a TDD configuration 6, respectively. The different configurations are for different forwarding and reverse link resource ratio, considering the D2D communication may be a bi-directional transmission, the resource ratio may be adjusted according to the traffic type and channel quality jointly.

Similarly, for different TDD configurations, the resulting ratio control flexibility and HARQ timing capability may be various. Please note that for subframe 3 and subframe 8 in TDD configuration 0, since there may be no DL PDSCH associated with the PUCCH A/N field, mainly due to less DL subframes in this configuration, it may be more beneficial to locate the D2D DCCH at band-edge, without considering the interference from PUCCH. And for TDD configuration 5, since only 1 HARQ process may be allowed in UL, it may be hard to ensure backwards compatibility and of less need to further divide the single HARQ process between cellular and D2D sub-systems, so no D2D and cellular-compatible subframe 402 may co-exist in the configuration.

In some embodiments, in order to maintain compatibility of the cellular devices 121 with the legacy HARQ timing, the network node 110 may further allocate jointly subframes of a same HARQ process to only one of: cellular-only 401 and D2D and cellular-compatible subframes 402, so that all subframes corresponding to the same HARQ process are either cellular-only 401 or D2D and cellular-compatible subframes 402, but not in a mixed way.

Action 307

Since the amount of cellular and D2D data traffic may vary in the mixed wireless network 100, network node 110 may need to allocate more or less cellular-only and D2D and cellular-compatible subframes 401, 402, depending on the amount of traffic in each. In relation to FIGS. 6-15, this means that depending on how much cellular and D2D transmission there may be, the network node 110 may allocate the patterned subframes in the figures, to either cell-only subframes 401, or D2D and cellular-compatible subframes 402.

Thus, in this action, the network node 110 may adapt in the time division multiplexing 301 and the frequency division multiplexing 302, a ratio of cellular-only 401 and D2D and cellular-compatible subframes 402, dynamically, based on an amount of resources required by cellular signalling and an amount of resources required by D2D signalling. In some embodiments, this dynamic adaptation may be carried out according to traffic type and/or channel quality. In some embodiments, the traffic volume may provide information of how many bits need to be sent, while in some embodiments the channel quality may provide information of how many resources needed per bit. By combining the two, the network node 110 may know how many resources are needed for both cellular and D2D communication, and therefore may be able to decide how to divide the resources between the two. Traffic type may be determined by inspecting the data packet by using the existing technology of DPI (Deep Packet Inspection) at the network node 110 side, or assisted by core network entities like PDN Gateway. Channel quality may be acquired from a Channel State Information (CSI) report from the devices 121, 122 123.

Figure 16:
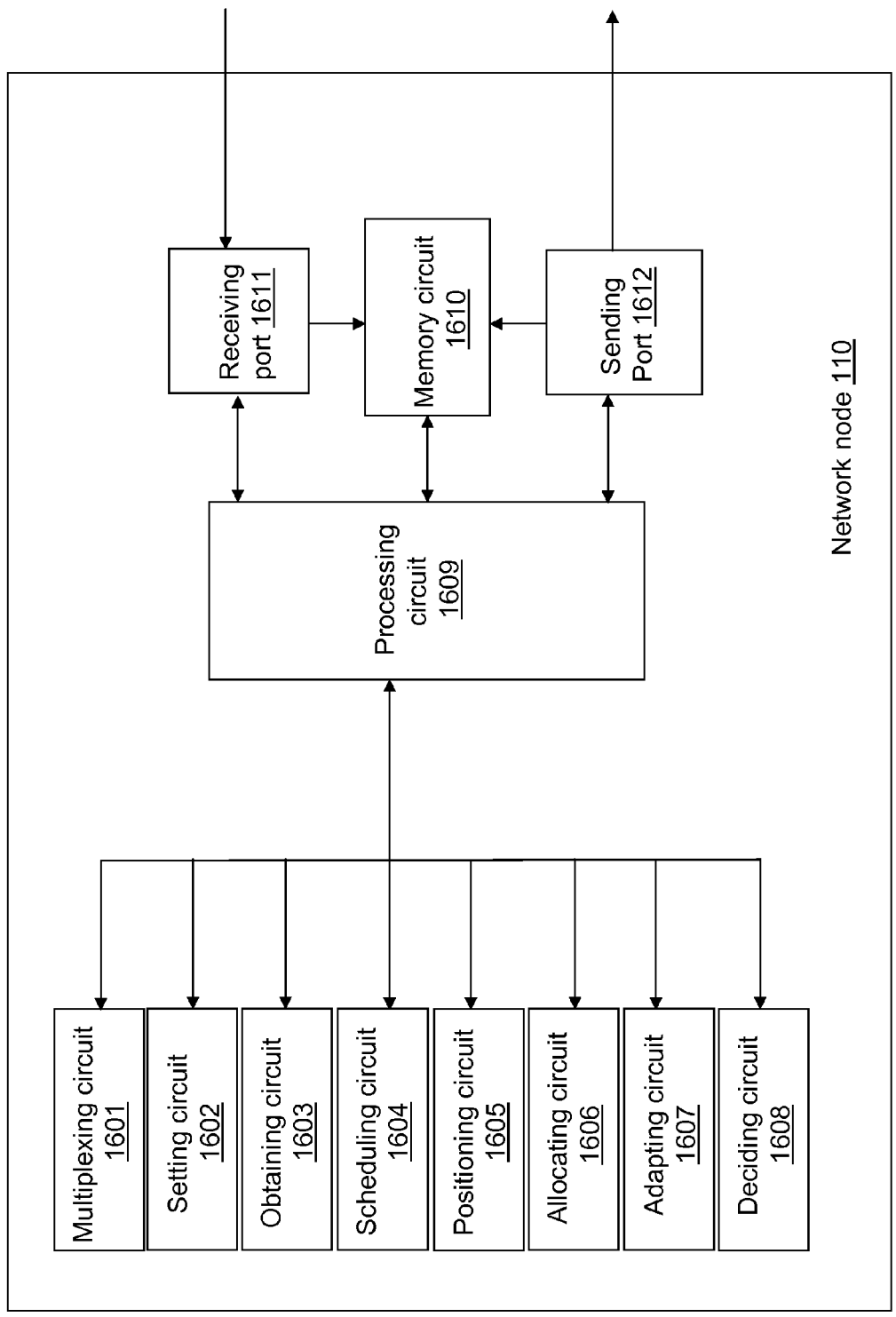
FIG. 16 is a schematic block diagram illustrating embodiments of a network node.

To perform the method actions in the network node 110 described above in relation to FIGS. 3-4 and 6-15 for multiplexing a physical channel 400, the network node 110 comprises the following arrangement depicted in FIG. 16. As mentioned above, the network node 110 and devices 121, 122, 123 are comprised in a mixed wireless network 100, wherein the mixed wireless network 100 further comprises a cellular network comprising one or more cellular channels and a D2D network comprising one or more D2D channels.

The network node 110 comprises a multiplexing circuit 1601, wherein the multiplexing circuit 1601 is configured to time division multiplex the physical channel 400 between a first group of cellular channels 411, 412 and a first group of D2D channels 431, 432, and frequency division multiplex the physical channel 400 between a second group of cellular channels 421 and the first group of D2D channels 431, 432.

In some embodiments, the physical channel 400 may comprise two types of subframes: a cellular-only subframe 401 and a D2D and cellular-compatible subframe 402, wherein the cellular-only subframe 401 is associated with the first group of cellular channels, and the D2D and cellular-compatible subframe 402 is associated with the second group of cellular channels 421 and the first group of D2D channels 431, 432.

In some embodiments, the first group of cellular channels 411, 412 may comprise a cellular channel that is prescheduled with a fixed timing and resource location, and the second group of cellular channels 421 may comprise a cellular channel that is dependent on the signalling of another cellular channel.

In some embodiments, the first group of cellular channels 411, 412 may comprise a cellular PUCCH D-SR/CQI channel, the second group of cellular channels 421 may comprise a PUCCH A/N channel and the first group of D2D channels 431, 432 may comprise a DCCH and a D2D DSCH.

In some embodiments, at least one of the first group of cellular channels 411, 412 and the second group of cellular channels 421 may further comprise a cellular Physical Uplink Shared Channel, PUSCH.

In some other embodiments, the first group of cellular channels 411, 412 may further comprise a PUCCH A/N channel.

In some embodiments, the network node 110 may further comprise a setting circuit 1602, which may be configured to set a frequency margin 440 between the second group of cellular channels 421 and the first group of D2D channels 431, 432.

In some of these embodiments, the frequency margin 440 may comprise 7 or more physical resource blocks.

In some embodiments, wherein the devices 121, 122, 123 may comprise cellular devices 121 and D2D devices 122, 123, the network node 110 may further comprise an obtaining circuit 1603 which is configured to, for each cellular device 121 to be allocated or already allocated into the D2D and cellular-compatible subframe 402, obtain information about interference of one or more active D2D devices 122, 123 in the D2D and cellular-compatible subframe 402 into which each cellular device 121 is to be allocated or is already allocated.

In some of these embodiments, obtain information about interference may comprise one of: to measure the interference, and to receive the information about interference from at least one of the D2D devices 122, 123.

In some embodiments, the setting circuit 1602 may be further configured to set the frequency margin 440 when the obtained information about interference is above an interference threshold.

In some embodiments, the D2D and cellular-compatible subframe 402 may have a position for the second group of cellular channels 421, and the network node 110 may further comprise a scheduling circuit 1604 configured to schedule only cellular devices 121 that are transmitting below a first power threshold in the position for the second group of cellular channels 421.

In some embodiments, the network node 110 may further comprise a positioning circuit 1605 further configured to position repetitively cellular-only 401 and D2D and cellular-compatible subframes 402 within the physical channel 400.

In some of these embodiments, the positioning circuit 1605 may be further configured to position repetitively cellular-only 401 and D2D and cellular-compatible subframes 402 within the physical channel 400 with a timing pattern, wherein the timing pattern is based on a HARQ timing of the cellular network.

In some embodiments, the network node 110 may further comprise an allocating circuit 1606 configured to allocate jointly subframes of a same HARQ process to only one of: cellular-only 401 and D2D and cellular-compatible subframes 402, so that all subframes corresponding to the same HARQ process are either cellular-only 401 or D2D and cellular-compatible subframes 402.

In some embodiments, the network node 110 may further comprise an adapting circuit 1607 configured to adapt, in time division multiplexing and frequency division multiplexing, a ratio of cellular-only 401 and D2D and cellular-compatible subframes 402, dynamically, based on an amount of resources required by cellular signalling and an amount of resources required by D2D signalling.

In some embodiments, the network node 110 may further comprise a deciding circuit 1608 further configured to decide a frequency and/or time interval in the D2D and cellular-compatible subframe 402 of the cellular and the D2D channels dynamically, based on the obtained information about interference, so that the obtained information about interference is within a determined interference threshold.

In some embodiments, the network node 110 may be one of: a base station, a stationary relay node, a mobile relay node, the first device 121, the second device 122, the third device 123 and a wireless device other than the first device 121, the second device 122 and the third device 123.

The scheduling circuit 1603 may be comprised in a scheduler. The scheduler may manage the cellular communications of devices such as the first device 121, as well as the D2D communications of devices such as the second device 122 and the third device 123. The scheduler determines if, which and when devices have the possibility to communicate in a direct D2D communication. The scheduler may provision a discovery signal to be used between two devices to determine their proximity and/or D2D link estimation. It may also assign resources for the D2D discovery signal and/or a D2D data channel and/or a D2D control channel. It may relay information between the at least two devices, and it may configure connection parameters for the at least two devices of the D2D link, such as power setting, e.g., actual, min, max, coding and modulation schemes, segmentation configuration, e.g., transport block sizes, parameters and/or security keys for encryption/integrity protection, protocol parameters, which Radio Access Technology, spectrum/carrier to use for D2D link. Typically, the scheduler may be co-located with the network node 110. The network node co-located with the scheduler may be in some embodiments: a base station, a stationary relay node -not pictured-, a mobile relay node—not pictured—, the first device 121, the second device 122, the third device 123, or a wireless device other than the first device 121, the second device 122 and the third device 123. The scheduler may be capable of communicating with devices such as the first device 121, the second device 122 and the third device 123 over a respective scheduler link. The scheduler may also communicate with other devices over other D2D controller links.

The embodiments herein for handling a D2D communication may be implemented through one or more processors, such as a processing circuit 1609 in the network node 110 depicted in FIG. 16, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It may be however feasible with other data carriers such as a memory stick. The computer program code may furthermore be provided as pure program code on a server and downloaded to the network node 110.

The network node 110 may further comprise a memory circuit 1610 comprising one or more memory units. The memory circuit 1610 may be arranged to be used to store data such as, the information received or measured by the processing circuit 1609 in relation to obtaining the device location and/or interference, and applications to perform the methods herein when being executed in the network node 110. Memory circuit 1610 may be in communication with the processing circuit 1609. Any of the other information processed by the processing circuit 1609 may also be stored in the memory circuit 1610.

In some embodiments, information regarding the location of the devices may be received from another structure in the mixed wireless network 100 through a receiving port 1611. In some embodiments, the receiving port 1611 may be, for example, connected to a positioning sensor, e.g., GPS. In other embodiments, the receiving port 1611 may be a network based positioning service via a corresponding communication protocol. Since the receiving port 1611 may be in communication with the processing circuit 1609, the receiving port 1611 may then send the device location information to the processing circuit 1609. The receiving port 1611 may be configured to receive other information. In some embodiments, information regarding the interference of the devices may be received from another structure in the mixed wireless network 100 through the receiving port 1611. Since the receiving port 1611 may be in communication with the processing circuit 1609, the receiving port 1611 may then send the device interference information to the processing circuit 1609.

The information received or measured by the processing circuit 1609 in relation to the location of the devices and/or obtaining the interference of the devices 122, 123, may be stored in the memory circuit 1610 which, as stated earlier, may be in communication with the processing circuit 1609 and the receiving port 1611.

The processing circuit 1609 may be further configured to send information, such as transmission grants, through a sending port 1612, which may be in communication with the processing circuit 1609, and the memory circuit 1610

Those skilled in the art will also appreciate that the multiplexing circuit 1601, the setting circuit 1602, the obtaining circuit 1603, the scheduling circuit 1604, the positioning circuit 1605, the allocating circuit 1606, the adapting circuit 1607 and the deciding circuit 1608 described above may refer to a combination of analog and digital circuits, and/or one or more processors configured with software and/or firmware (e.g., stored in memory) that, when executed by the one or more processors such as the processing circuit 1609, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for multiplexing a physical channel, between the network node and one or more devices in a mixed wireless network, wherein the mixed wireless network comprises a cellular network comprising one or more cellular channels and a Device-to-Device (D2D) network comprising one or more D2D channels, the method comprising:
    time division multiplexing the physical channel between a first group of cellular channels of the one or more cellular channels and a first group of D2D channels of the one or more D2D channels; and
    frequency division multiplexing the physical channel between a second group of cellular channels of the one or more cellular channels and the first group of D2D channels.

2. The method of claim 1, wherein the physical channel comprises two types of subframes: a cellular-only subframe and a D2D and cellular-compatible subframe, wherein the cellular-only subframe is associated with the first group of cellular channels, and wherein the D2D and cellular-compatible subframe is associated with the second group of cellular channels and the first group of D2D channels.

3. The method of claim 1, wherein the first group of cellular channels comprises a first cellular channel that is prescheduled with a fixed timing and resource location, and wherein the second group of cellular channels comprises a second cellular channel that is dependent on the signalling of another cellular channel.

4. The method of claim 1, wherein the first group of cellular channels comprises a cellular Physical Uplink Control Channel Dedicated-Scheduling Request/Channel Quality Indicators (PUCCH D-SR/CQI) channel, wherein the second group of cellular channels comprises a PUCCH Acknowledgement/Negative Acknowledgement (PUCCH A/N) channel, and wherein the first group of D2D channels comprises a D2D Control Channel (DCCH) and a D2D Shared Channel (DSCH).

5. The method of claim 1, wherein at least one of the first group of cellular channels and the second group of cellular channels further comprises a cellular Physical Uplink Shared Channel (PUSCH).

6. The method of claim 1, wherein the first group of cellular channels comprises a Physical Uplink Control Channel Acknowledgement/Negative Acknowledgement (PUCCH A/N) channel.

7. The method of claim 1, further comprising setting a frequency margin between the second group of cellular channels and the first group of D2D channels.

8. The method of claim 7, wherein the frequency margin comprises seven or more physical resource blocks.

9. The method of claim 7, wherein the one or more devices comprises one or more cellular devices and one or more D2D devices, the method further comprising:
    for each cellular device of the one or more cellular devices to be allocated or already allocated into a D2D and cellular-compatible subframe, obtaining information about interference of one or more active D2D devices of the one or more D2D devices in the D2D and cellular-compatible subframe into which the cellular device is to be allocated or is already allocated.

10. The method of claim 9, wherein obtaining information about interference comprises one of: measuring the interference, and receiving the information about interference from at least one of the one or more D2D devices.

11. The method of claim 9, wherein the setting the frequency margin is performed when the obtained information about interference is above an interference threshold.

12. The method of claim 9, wherein the D2D and cellular-compatible subframe has a position for the second group of cellular channels, the method further comprising:
scheduling only those of the one or more cellular devices that are transmitting below a first power threshold in the position for the second group of cellular channels.

13. The method of claim 2, further comprising positioning repetitively the cellular-only subframe and the D2D and cellular-compatible subframe within the physical channel.

14. The method of claim 13, wherein the positioning repetitively of the cellular-only subframe and the D2D and cellular-compatible subframe within the physical channel is done with a timing pattern, and wherein the timing pattern is based on a Hybrid Automatic Repeat Request (HARQ) timing of the cellular network.

15. The method of claim 14, further comprising allocating jointly subframes of a same HARQ process to only one of: the cellular-only subframe and the D2D and cellular-compatible subframe, so that all subframes corresponding to the same HARQ process are either cellular-only subframes or D2D and cellular-compatible subframes.

16. The method of claim 2, further comprising dynamically adapting, in the time division multiplexing and the frequency division multiplexing, a ratio of the cellular-only subframes and the D2D and cellular-compatible subframes based on an amount of resources required by cellular signalling and an amount of resources required by D2D signalling.

17. The method of claim 9, further comprising dynamically deciding a frequency or a time interval in the D2D and cellular-compatible subframe of the cellular and the D2D channels based on the obtained information about interference, so that the obtained information about interference is within a determined interference threshold.

18. The method of claim 1, wherein the network node is one of: a base station, a stationary relay node, and a mobile relay node.

19. A network node for multiplexing a physical channel, between the network node and one or more devices in a mixed wireless network, wherein the mixed wireless network comprises a cellular network comprising one or more cellular channels and a Device-to-Device (D2D) network comprising one or more D2D channels, the network node comprising:
a multiplexing circuit configured to:
time division multiplex the physical channel between a first group of cellular channels of the one or more cellular channels and a first group of D2D channels of the one or more D2D channels; and
frequency division multiplex the physical channel between a second group of cellular channels of the one or more cellular channels and the first group of D2D channels.

20. The network node of claim 19, wherein:
the first group of cellular channels comprises a cellular Physical Uplink Control Channel Dedicated-Scheduling Request/Channel Quality Indicators (PUCCH D-SR/CQI) channel,
the second group of cellular channels comprises a PUCCH Acknowledgement/Negative Acknowledgement (PUCCH A/N) channel, and
the first group of D2D channels comprises a D2D Control Channel (DCCH) and a D2D Shared Channel (DSCH).

21. The method of claim 1, wherein:
the first group of D2D channels comprises a D2D Control Channel and a D2D Shared Channel, wherein the first group of D2D channels includes a first plurality of resource blocks (RBs) of the physical channel;
the first group of cellular channels comprises a cellular Physical Uplink Shared Channel; and
the second group of cellular channels comprises a Physical Uplink Control Channel (PUCCH) Acknowledgement/Negative Acknowledgement (A/N) channel, wherein the second group of cellular channels includes a second plurality of RBs of the physical channel.

* * * * *

UNITED STATES PATENT AND TRADEMARK OFFICE
CERTIFICATE OF CORRECTION

PATENT NO. : 9,807,810 B2  
APPLICATION NO. : 14/650484  
DATED : October 31, 2017  
INVENTOR(S) : Lu et al.

Page 1 of 1

It is certified that error appears in the above-identified patent and that said Letters Patent is hereby corrected as shown below:

In the Specification

In Column 3, Line 38, delete "gain;" and insert -- gain. --, therefor.

In Column 4, Line 63, delete "D2D." and insert -- D2D, --, therefor.

In Column 5, Line 50, delete "graph the" and insert -- graph of the --, therefor.

In Column 8, Line 48, delete "121." and insert -- 121, --, therefor.

In Column 9, Lines 10-11, delete "prescheduied" and insert -- prescheduled --, therefor.

In Column 9, Line 13, delete "D-8R/CQL" and insert -- D-SR/CQI, --, therefor.

In Column 14, Line 32, delete "position. In" and insert -- position, in --, therefor.

In Column 18, Line 26, delete "adapt" and insert -- adapt, --, therefor.

In Column 18, Line 46, delete "122" and insert -- 122, --, therefor.

In Column 19, Line 13, delete "channel" and insert -- channel, --, therefor.

In Column 20, Line 25, delete "scheduling circuit 1603" and insert -- scheduling circuit 1604 --, therefor.

Signed and Sealed this  
Twenty-seventh Day of November, 2018

Andrei Iancu  
*Director of the United States Patent and Trademark Office*